(12) United States Patent
Dunning et al.

(10) Patent No.: US 12,717,950 B2
(45) Date of Patent: Aug. 25, 2026

(54) INHERITANCE-BASED ACCESS RIGHTS GOVERNANCE

(71) Applicant: HEWLETT PACKARD ENTERPRISE DEVELOPMENT LP, Spring, TX (US)

(72) Inventors: Ted E. Dunning, San Jose, CA (US); Kyrylo Iun, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 127 days.

(21) Appl. No.: 18/743,894

(22) Filed: Jun. 14, 2024

(65) Prior Publication Data

US 2025/0384152 A1 Dec. 18, 2025

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS 6,405,315 B1 * 6/2002 Burns .................... G06F 16/10 713/193
11,379,416 B1 * 7/2022 Werr ................... G06Q 10/103
2007/0214497 A1 * 9/2007 Montgomery ...... G06F 21/6218 726/4
2010/0332966 A1 * 12/2010 Idicula ................. G06F 16/835 715/234
2020/0125758 A1 * 4/2020 Xie .................... G06F 21/6209

OTHER PUBLICATIONS

AUTH0 by OKTA; "Role-Based Access Control"; https://auth0.com/docs/manage-users/access-control/rbac; downloaded May 1, 2024; 24 pp.

OKTA, CIAM for Dummies; "What is Attribute-Based Access Control (ABAC)?"; https://www.okta.com/blog/2020/09/attribute-based-access-control-abac/; Sep. 2020; downloaded May 1, 2024; 9 pp.

(Continued)

*Primary Examiner* — Viet D Vu

(74) *Attorney, Agent, or Firm* — Trop, Pruner & Hu, P.C.

(57) ABSTRACT

A technique includes receiving a request. The request is associated with an operation, a target path and a requestor. The process includes, responsive to the request, accessing metadata that is associated with access control governance for a data resource. The metadata is stored in a directory tree and is arranged according to a hierarchical order. The technique includes, based on the metadata, associating the requestor with a role. The process includes associating the target path with a location of the directory tree structure and determining an inherited permission based on the role. Determining the inherited permission includes associating, by inheritance, the location with an ancestor permission that corresponds to a prefix of the target path. The technique includes, based on the inherited permission, determining whether to allow or deny the request.

17 Claims, 12 Drawing Sheets

(56) References Cited

OTHER PUBLICATIONS

"Apache Kafka is a distributed publish-subscribe messaging system", available online at <https://web.archive.org/web/20121219022855/https://kafka.apache.org/>, Dec. 19, 2012, 1 page.
Cyber Research Team, "Data Breach: Millions of Senior Citizens' Names, Emails, and Phone Numbers Compromised in Senior Care Review Website Database Breach", available online at <https://web.archive.org/web/20210809133934/https://www.wizcase.com/blog/senioradvisor-breach-report/>, Aug. 9, 2021, 4 pages.
Fabry, R. S., "Capability-Based Addressing," Communications of the ACM, vol. 17, pp. 403-412, 1974.
Feldman, D., et al., "Solving the Bottom Turtle—a SPIFFE Way to Establish Trust in Your Infrastructure via Universal Identity," 2020, 194 pages.
Hardt, D., "The OAuth 2.0 Authorization Framework," Request for Comments (RFC 6749), Oct. 2012, 76 pages.
Harrison, J., "Formal Verification at Intel," Jun. 2003., 27 pages.
Klein, G., et al., "sel4: Formal Verification of an OS Kernel," in Proceedings of the ACM SIGOPS 22nd Symposium on Operating Systems Principles (SOSP '09), 2009, pp. 207-220, Association for Computing Machinery, 15 pages.
Lamport, L., "Specifying Systems: The TLA+ Language and Tools for Hardware and Software Engineers," Addison-Wesley Longman Publishing Co., Inc., USA, 2002.
Loscocco, P., & Smalley, S., "Integrating Flexible Support for Security Policies into the Linux Operating System," Technical Report, NSA, Feb. 2001, 15 pages.
Madelyn Bacon, "AWS S3 bucket leak exposes millions of Verizon customers' data", available online at <https://www.techtarget.com/searchsecurity/news/450422709/Misconfigured-AWS-S3-bucket-exposes-millions-of-Verizon-customers-data>, Jul. 14, 2017, 6 pages.
Nipkow, T., Paulson, L. C., & Wenzel, M., "Isabelle/HOL: A Proof Assistant for Higher-Order Logic," vol. 2283, Springer Science & Business Media, 2002,17 pages.
Wikipedia, "Two-person rule", available online <https://en.wikipedia.org/w/index.php?title=Two-person_rule&oldid=1178717348>, Oct. 5, 2023, 5 pages.
Xu et al., "A Federated Capability-based Access Control Mechanism for Internet of Things (IoTs)", May 1, 2018, 17 pages.

* cited by examiner

FIG. 9

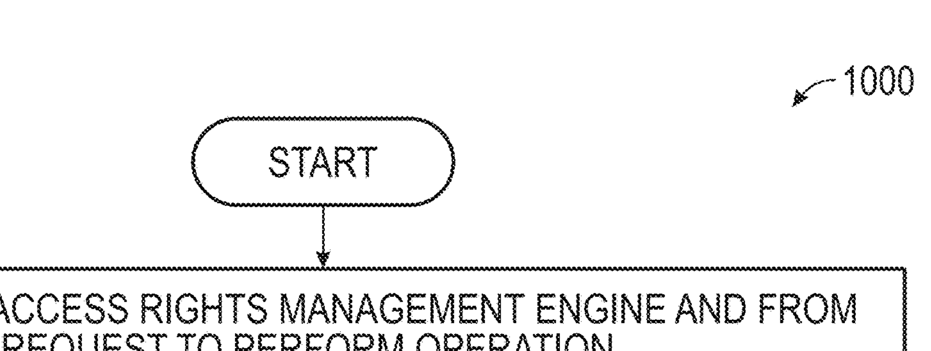

1004

RECEIVE, BY ACCESS RIGHTS MANAGEMENT ENGINE AND FROM REQUESTOR, REQUEST TO PERFORM OPERATION

1008

RESPONSIVE TO REQUEST, ACCESS, BY ACCESS RIGHTS MANAGEMENT ENGINE, METADATA ASSOCIATED WITH ACCESS RIGHTS GOVERNANCE FOR RESOURCE, AND REGULATING, BY ACCESS RIGHTS MANAGEMENT ENGINE, RESPONSE TO REQUEST BASED ON METADATA, WHERE METADATA INCLUDES PATH ASSOCIATED WITH REQUESTOR, AND REGULATING RESPONSE TO REQUEST INCLUDES:

- DETERMINING INHERITED ROLE FOR REQUESTOR BASED ON ROLE ASSOCIATED WITH PREFIX OF PATH.
- DETERMINING, BASED ON INHERITED ROLE, WHETHER METADATA ALLOWS OPERATION FOR INHERITED ROLE
- INITIATING ACTION IN FURTHERANCE OF OPERATION RESPONSIVE TO DETERMINATION THAT METADATA ALLOWS OPERATION FOR INHERITED ROLE

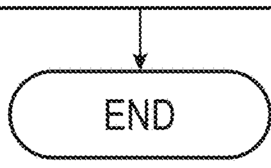

FIG. 10

INHERITANCE-BASED ACCESS RIGHTS GOVERNANCE

BACKGROUND

A computer system may have an access control infrastructure to regulate which principals (e.g., users or applications) may view or use resources of the computer system, as well as regulate the extent of resource usage. In an example, a computer system may regulate resource access based on a role-based access control (RBAC) authorization model in which a principal's access rights correspond to the principal's role (e.g., end user, administrator or manager). In another example, a computer system may regulate resource access based on an attribute-based access control (ABAC) authorization model in which a principal's access rights correspond to attributes (e.g., a user ID or a security clearance) of the principal.

BRIEF DESCRIPTION OF THE DRAWINGS

FIG. 9 is an illustration of a non-transitory storage medium that stores machine-readable instructions that, when executed by a machine, cause the machine to derive an inherited permission from access control governance metadata according to an example implementation.

FIG. 10 is an illustration of a technique that derives an inherited role from access control governance metadata according to an example implementation.

DETAILED DESCRIPTION

Figure 1:
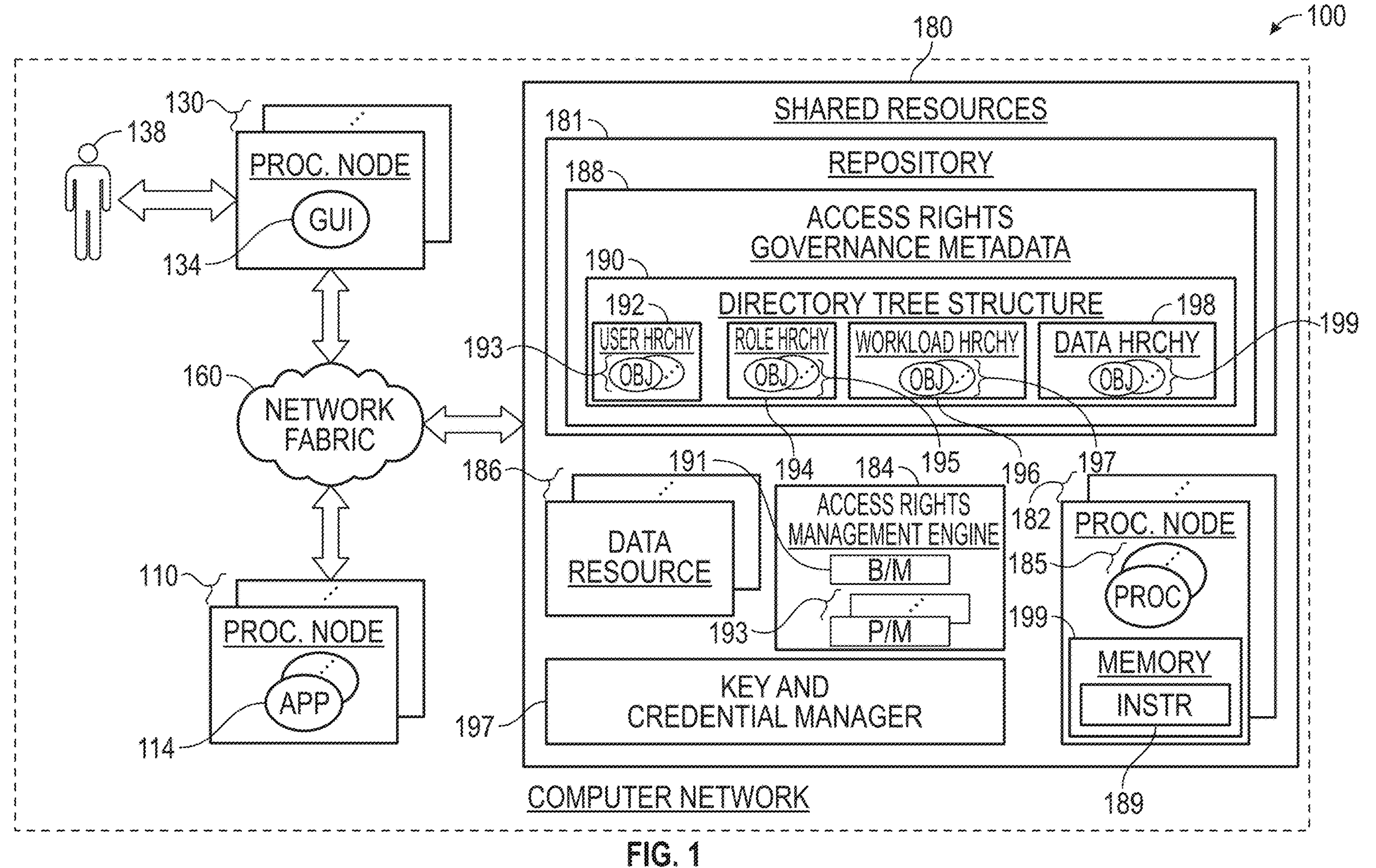
FIG. 1 is a block diagram of a computer network that includes an access rights management engine to control access rights based on an inheritance-based access rights governance model, according to an example implementation.

A computer system may include an access control infrastructure that regulates access to resources of the system based on a permission structure. The permission structure defines which principals have permissions to access resources of the system, as well as controls the extent of resource usage by the principals when access is permitted. The permission structure may be defined by a governance language. Properly expressing a permission structure using a governance language may be challenging, as some governance languages may be overly complex, while other governance languages may be relatively low level and difficult to understand. Moreover, for the same reasons, a permission structure may be challenging to audit. A governance language may also be limited to governing a particular type of resource. A system with resources of multiple types might therefore have multiple governance languages, which makes the access rights controls of the system even harder to understand.

Governance languages may also be inadequate for purposes of defining a permission structure for resources that are shared by multiple tenants and which may or may not share the same namespace. A namespace operator may have certain access privileges, or rights, for purposes of managing the namespace. In one approach to assigning access rights for a namespace that is shared by multiple tenants, the namespace operator may be assigned the role of "super user". A super user has unrestricted access rights. A challenge with a namespace operator being a super user is that there is no mechanism in place to prevent the namespace operator from accessing (e.g., viewing or modifying) tenant data and tenant namespace configurations.

As an alternative approach, a namespace operator may be given limited access rights so that the namespace operator may create tenants but not be allowed to access tenant data. A challenge with a namespace operator being limited in this way is that there is no flexibility to give the namespace operator some access rights to create tenants without also giving the namespace operator the rights to change permissions. With the namespace operator having the rights to change permissions, the namespace operator is not restricted from changing permissions to allow the namespace operator to access tenant data.

Moreover, a given tenant may have multiple sub-tenants, and a permission structure may not allow a tenant the administrative control to manage the access rights of its sub-tenants and therefore, act as an operator with respect to its sub-tenants. For example, a particular tenant may have multiple sub-tenants that correspond to different business units, such as groups, divisions or departments of the tenant. The tenant may be a relatively large business organization that desires to delegate permissions to sub-tenants within bounds. At the top level of the permission structure for the tenant, there are constraints on data, such as constraints that limit access rights to valid workloads or users. Below the top level, the permission structure for the tenant may, for example, impose certain additional constraints on business units and their respective internal structures. Each layer of the permission structure for the tenant may add constraints to the way that the data is managed, and the layers and constraints may be managed by independent teams. Unless the tenant can act as an effective operator for its sub-tenants, there is a high likelihood that the permission structure for the tenant is not implemented correctly. Even if the governance language allows a permission structure to limit super user permissions of the namespace operator appropriately, the governance language may not allow a permission structure to be defined that allows a tenant to be an effective operator for its sub-tenants.

In accordance with example implementations that are described herein, a permission structure may be constructed according to an inheritance-based access rights governance model, which allows access rights to be inherited and addresses the above-noted challenges with existing governance languages. As described herein, the permission structure represents hierarchical organizations of metadata objects (or "objects") that correspond to resources to be protected. In accordance with example implementations, a metadata object is classified as belonging to one of four base metadata types: data, role, user and workload. In accordance with example implementations, the permission structure contains a hierarchical organization of data objects, a hierarchical organization of role objects, a hierarchical organization of user objects and a hierarchical organization of workload objects. As more fully described herein, the permission structure also assigns access rights to the metadata objects. In the context that is used herein, an "object", such as a data object, role object, user object or workload object is a representation, in the permission structure, of a resource to be protected.

In the context that is used herein, an "access right" refers to a privilege or permission. In an example, a data object may correspond to data (e.g., a unit of data of a managed data resource) to be protected, and the permission structure may assign one or multiple access rights to the data object, such as access rights that control which workloads or users that may view, read from and/or write to the data. In another example, a role object may correspond to a role, and the permission structure may assign one or multiple access rights to the role object, such as access rights that control which users may assign the role. In another example, a user object may correspond to a user, and the permission structure may assign one or multiple access rights to the user object.

In accordance with example implementations, the permission structure assigns roles to principals, and the permission structure expresses permission constraints in terms of the roles. In example, a principal may be a human user (called a "user" herein) and correspond to a user object of the permission structure. In another example, a principal may be a workload, such as an application process or a collection of processes represented by a single identity, and the workload corresponds to a workload object of the permission structure.

In an example of features that promote access right inheritance, the permission structure allows a principal hierarchy (e.g., a hierarchy of user objects or a hierarchy of workload objects) to be defined, allows roles to the attached to locations of the principal hierarchy, and allows the roles to be inherited by descendants of the principal hierarchy. In accordance with example implementations, each principal object of the principal hierarchy is given a path name (also referred to as a "path" herein) such that the principal hierarchy is encoded by shared prefixes of path names.

In an example, a principal hierarchy may be a hierarchy of user objects, which corresponds to users of a multi-tenant namespace, and each user object is assigned a path of the permission structure. In an example, a tenant may correspond to a business organization ACME, and all user objects corresponding to users of ACME have path names that share the path name prefix for the tenant ACME. For example, all ACME user objects may have a path that begins with the path prefix "hdp://user/acme". A particular role may be attached to the hdp://user/acme" path, and due to role inheritance, any user object corresponding to ACME inherits this role because the user object has a path having the "hdp://user/acme" prefix.

In accordance with example implementations, permissions are expressed by access control expressions of the permission structure. An access control expression associates a permission for an operation on an object (e.g., a data object, role object, user object or workload object) with one or multiple access control lists. An access control list includes the roles that are permitted to perform the operation on the object. The access control expression allows the specified operation if it is satisfied. An access control expression is said to be satisfied if all of its constituent access control lists are satisfied. An access control list is satisfied if the principal desiring to perform an action has at least one of the roles specified in the access control list. As further described herein, the permission structure may define multiple access control expressions for the same operation on an object, with each access control expression associating access control lists with the operation. Access control expressions for the same operation on an object may be combined into a single access control expression. The single access control expression associates the permission for an operation on an object with the conjunction of the access control lists from multiple access control lists for the same operation on the same object. A single access control expression represents permission for a principal to perform an operation on an object if the principal has at least one role from each access control list of the expression.

The permission structure allows permissions to be inherited through the mechanism of "effective" access control expressions. In the context that is used herein, an "effective" access control expression for an operation on an object is the conjunction of all access control expressions for that operation, including any access control expression at the path of the object and any access control expression(s) at proper prefixes of the object. Therefore, if the permission structure assigns access control expressions to proper prefixes of the path of an object, these access control expressions and correspondingly, the permissions contained therein to perform the corresponding operations on that object, are inherited by the path. An effective access control expression represents permission for a principal to perform an operation on an object if the principal has at least one role from each of the access control lists of the effective access control expression.

In accordance with example implementations, the access control expressions, in addition to controlling access to data, control access rights to roles and principals. In this sense, roles and principals may be considered to be access-protected resources. For role objects, access control expressions may define, for example, permissions that control who can apply the corresponding roles or who can incorporate the roles into access control lists as well as controlling whether the permissions on the roles can be modified. For user objects, access control expressions may define, for example, permissions for which corresponding users can perform administrative operations, such as changing permissions or assigning roles.

In accordance with example implementations, the permission structure may be described, or represented, by access rights governance metadata (herein called "metadata"). The application of permissions to control operations on the metadata itself makes the system logically complete (sometimes called metacircular) in that it is possible to logically determine who might access data or metadata even with the collaboration of other users to change permissions. Moreover, delegation is also enabled by these properties because the properties allow a tenant to reserve the right to change permissions on a path to themselves (using local permissions, which are described herein) while allowing more liberal permissions to be inherited.

In accordance with example implementations that are described herein, an entity called "an access rights management engine" applies the permission structure that is represented by the metadata for purposes of controlling access to managed resources and controlling access to the metadata itself. In accordance with example implementations, requests that are processed by the access rights management engine may correspond to one of two types: a data access request to perform an operation on a managed data resource that is separate from but protected by the metadata, and a request to perform an operation on the metadata.

In accordance with example implementations, the access rights management engine may regulate data access requests as follows. A principal (e.g., a workload), a requestor, may desire to perform a certain access operation (e.g., a read or write operation) on a dataset of a managed data resource. For this purpose, the requestor may first submit an access request to the access rights management engine for purposes of the requestor acquiring, from the engine, a credential for the operation and a location identifier that corresponds to the requested dataset. In an example, the access request may include data that represents a proof of identity for the principal, an operation (the "requested operation") and a logical target path. Responsive to the access request, the access rights management engine accesses the metadata for purposes of determining whether the metadata indicates that the access request should be permitted. If the metadata indicates that the access request should be permitted, then the access rights management engine acquires a credential and a location identifier, which together allow the requestor to access the dataset. The access rights management engine then sends this information to the requestor in a response to the access request, and the requestor may then send a request containing the credential and location identifier to the managed resource. Otherwise, if the metadata indicates that the requestor's access request should not be permitted, the access rights management engine denies the access request and returns a failure response to the requestor.

In an example, the location identifier may be a Uniform Resource Locator (URL), and the credential may be a time-limited. A time-limited credential may be particular advantageous for purposes of eliminating the burden of managing credential revocations. In an example, the credential may be a time-limited cryptographic key. Because the requestor, if the requested operation is allowed, independently initiates the requested operation with the managed data resource using the URL and cryptographic key, the flow for performing the requested operation and is separate from the flow used to request the credential and location identifier. This alleviates the burden that is otherwise imposed on the access rights management engine to perform the requested operation. This also alleviates the burden on the user of the credential to ensure that the credential is eventually revoked. It also makes the burden of guaranteeing that a credential is never leaked easier because the leakage of a credential is only a risk during the lifetime of the credential which is typically only a few minutes.

The access rights management engine, in accordance with example implementations, may handle requests that are directed to operations on the metadata. In an example, a principal (e.g., a user), a requestor, may desire to access or modify the metadata. In an example, a requested operation may be a request to read the metadata associated (directly or by inheritance) with a path. In another example, a requested operation may be to read all path names sharing a particular prefix. In another example, a requested operation may be an ApplyRole operation to apply, or attach, a role to a particular principal path that is represented by the metadata. In another example, the requested operation on the metadata may be an operation to add or modify or delete an access control expression (e.g., add a role to an access control list).

A request to perform an operation on the metadata may include data that represents a proof of identity for the principal, the requested operation and a target path for the operation. Responsive to the request, the access rights management engine accesses the metadata for purposes of determining whether the metadata indicates that the requested operation is allowed. If the access rights management engine determines, based on the metadata, that the metadata allows the operation, then the access rights management engine performs the requested operation on the metadata and returns an acknowledgement to the requestor. Otherwise, the access rights management engine denies the request and returns a failure response to the requestor.

Referring to FIG. 1, in accordance with example implementations, an access rights management engine 184 regulates access to resources using a permission structure that is defined by access rights governance metadata 188 (also referred to herein as "the metadata 188"). As described herein, the access rights governance metadata 188 represents an inheritance-based permission structure. In accordance with example implementations, access rights governance metadata 188 is organized, or arranged, in a hierarchical tree structure, which is referred to as a "directory tree structure 190" herein. In the context that is used herein, a "directory tree structure" refers to an arrangement of directories, or locations, that has a top-level, or root, location, called the "root directory". The directory tree structure 190 has four sub-hierarchies below the root directory of the structure 190: a data hierarchy 198 that contains data metadata data objects 199 (or "data objects 199"); a role hierarchy 194 that contains role metadata objects 195 (or "role objects 195"); a user hierarchy 192 that contains user metadata objects 193 (or "user objects 193"); and a workload hierarchy 196 that contains workload metadata objects 197 (or "workload objects 197"). The data hierarchy 198 has a top-level directory, which is called the "data directory" herein. The role hierarchy 194 has a top-level directory, which is called the "role directory" herein. The user hierarchy 192 has a top-level directory, which is called the "user directory" herein. The workload hierarchy 196 has a top-level directory, which is called the "workload directory" herein.

A given directory of the directory tree structure 190 may contain zero, one or multiple directories (or "children"). A given directory of the directory tree structure 190 may contain zero, one or multiple units of data referred to as "metadata packets" herein. A given directory that contains one or multiple directories, called "child directories", is a parent (or "parent directory"). A parent directory may itself be a child of another parent directory. Moreover, depending on the location of a given directory within the directory tree structure 190, the directory may be an ancestor of zero, one or multiple directories, and the given directory may be a descendant of zero, one or multiple directories. A directory that has no descendants may be referred to herein as a "leaf directory" or "empty directory". A directory that has one or multiple descendants is referred to herein as an "interior directory". A directory may also contain children that are objects such as users, workloads, roles or data. A metadata object (e.g., a user object 193, role object 195, workload object 197 or data object 199) cannot have children and thus cannot be a directory.

Locations within the directory tree structure 190 are each associated with a name, and the unique sequence of names from the root of the directory tree structure 190 to a location in the directory structure 190 is referred to as the path name ("or path") of the location. The set of all metadata path names in a directory tree structure is called the "namespace". In accordance with example implementations that are described herein, the namespace corresponding to the directory tree structure 190 is a "hdp://" URL namespace, where "" represents the remaining part of a particular path that begins with the prefix "hdp://". Paths within the hdp:// namespace each begin with the prefix "hdp://", which corresponds to the root of the directory tree structure 190**, and all names in the sequence representing a path are separated by a "/" character.

In an example, the top-level data, user, role and workload directories may have path prefixes of "hdp://data", "hdp://role", "hdp://user", and "hdp://workload", respectively. User objects 193 are located within the user directory or within a descendent of the user directory. As such, a metadata packet corresponding to a particular user object 193 is stored at a location having a path that begins with the prefix "hdp://user". In accordance with example implementations, each user object 193 corresponds to a leaf node of the user hierarchy 192, and the leaf node stores a metadata packet that defines the user object 193. In particular, information defining how the user will prove their identity to the access rights management engine 184 would be stored in this metadata packet. In an example, Alice may be an employee of a tenant ACME, and a metadata packet corresponding to Alice may be stored in a directory having the path name of "hdp://user/acme/alice" with information defining an Open Authorization (OAUTH) domain and user name. In other examples, the metadata packet corresponding to Alice might contain a reference to a KERBEROS domain and user identifier.

In a similar manner, workload objects 197 are located within the workload directory or a descendant of the workload directory. In accordance with example implementations, each workload object 197 corresponds to a leaf node of the workload hierarchy 196, and the leaf node stores a metadata packet that defines the workload object 197. As such, a metadata packet corresponding to a particular workload object 197 is stored in directory having a path name that begins with the prefix "hdp://workload". In accordance with example implementations, the metadata packet associated with a workload might contain a Secure Production Identity Framework For Everyone (SPIFFE) domain and identifier. In another example, the metadata associated with a workload might contain an application identifier that must be associated with an application secret key using public key cryptographical methods.

A "role", in the context that is used herein, refers to a characterization that may be associated with one or multiple principals. In an example, a role may associate users with a real world business structure (e.g., a business organization or a department or division within a business organization). In another example, a role may associate users with patterns of enablement. In examples, a role may associate a user with a security clearance, administrative responsibilities, or other characterization. In other examples, a role may associate a workload with a particular application function, application family, domain name, execution location, security threat level, or other classification. Roles, in general, are mechanisms that allow the definition of permissions in terms of groups of principals rather than by direct reference to specific principals. Roles as described here are similar to an attribute in an attribute-based authorization control (ABAC) system.

A role object 195, in accordance with example implementations, has a path that begins with the prefix "hdp://role". In accordance with example implementations, each role object 195 corresponds to a leaf node of the role hierarchy 194, and the leaf node stores a metadata packet that defines the role object 195. In an example, a particular role might be associated with employees of ACME's engineering division, and a metadata packet corresponding to this role may be stored with the path name "hdp://role/acme/engineering". In another example, the metadata might define a particular role for production workloads that are managed by the engineering team: "hdp://role/acme/engineering/production". In another example, the metadata may define a particular role for a workload that is executed in a particular location: "hdp://role/acme/engineering/running-in-germany". In another example, the metadata may define a particular role for employees that who are responsible for deploying production workloads: "hdp://role/acme/engineering/devops-admin".

In accordance with example implementations, a role may be attached, or applied, to a given user object 193 or to a given group of user objects 193. More specifically, in accordance with example implementations, a role may be attached, or applied, to a location, or path, within the user subtree, either to the "hdp://user" directory or to any descendent of the "hdp://user" directory. Stated differently, a given role may be applied to a particular location that is identified with a path that has the prefix "hdp://user". Applying or attaching a role to a path of the user directory, in this context, refers to storing a metadata packet at the path, to associate the role with the path and all descendants of the path. In an example, Alice (from the example above) may be assigned the role of "hdp://role/acme/engineering" by storing a metadata object at "hdp://user/acme/alice" that represents the "hdp://role/acme/engineering" role. In an example, Alice may be assigned the rule of "hdp://role/acme/employee" through inheritance by storing a metadata object that represents the application of that role at "hdp://user/acme".

In a similar manner, a role may be attached, or applied, to a location within the workload directory, which is identified by a path that has "hdp://workload" as a prefix. Attaching a role to a path within the workload subtree means storing a metadata object at the workload path that represents the role.

A given principal may have multiple roles. For example, Alice, may be a manager of the testing department within ACME's engineering division and, in addition to the "hdp://role/acme/engineering" role, Alice may be assigned the roles of "hdp://role/acme/engineering/testing" and "hdp://role/acme/engineering/testing/manager", as indicated by metadata packets stored at "hdp://user/acme/alice".

The above-described examples illustrate direct role assignments. In a direct role assignment, a role is assigned to a principal object (i.e., a user object 193 or a workload object 197) by attaching the role to the path that corresponds the principal object. In accordance with example implementations, the permission structure enables inheritance of roles. In this context, an "inherited" role for a principal object is a role that is directly assigned to a proper prefix of the principal object's path. For example, Alice in the examples above corresponds to the path name of "hdp://user/acme/alice", and this path name defines Alice as being a descendent of the path "hdp://user/acme". The employees of ACME may be assigned the role of "hdp://role/acme/employee" by attaching the "hdp://role/acme/employee" role to the "hdp://user/acme" path. As further described herein, the "hdp://role/acme/employee" role may, for example, be paired with a permission that allows ACME employees to view a portion of shared resources dedicated exclusively to the tenant ACME. Because Alice is a descendent (here, a child) of "hdp://user/acme", Alice inherits the role of "hdp://role/acme/employee".

A principal object therefore has a collection of zero or one or multiple roles, which are referred to herein as the effective roles of the principal object. In the context that is used herein, the "effective" role(s) of a principal object refers to any role(s) directly attached to the principal object's path, as well as any inherited roles(s) corresponding to proper prefix (es) of the principal object's path. In an example, Alice may have a collection of effective roles, which may include, for example, directly-attached roles of "hdp://role/acme/engineering", hdp://role/acme/engineering/testing", and "hdp://role/acme/engineering/testing/manager" and further include the inherited role of "hdp://role/acme/employee".

In accordance with example implementations, any directory of the directory tree structure 190, whether an interior directory or a leaf directory, may contain one or multiple metadata packets that define one or multiple access control expressions. Stated differently, any of the "hdp://user", "hdp://workload", "hdp://role", hdp://data" directories or any descendant of these top-level directories may contain one or multiple metadata packets that define one or multiple access control expressions.

A request for a particular operation may need permission for the operation as well as permission(s) for one or multiple implied operations. In example, a request for a Read operation to read a particular dataset of a managed data resource needs permission for the Read operation as well as needs permission for the implied View operation to view the dataset. Therefore, the access rights management engine 184 determining whether the metadata indicates permission for a particular requested operation may include the engine 184 evaluating multiple effective access control expressions that correspond to both requested and implied operations.

An access control expression may be marked as "local" by the metadata (e.g., marked "local" by a local flag being set to true) in order to prevent inheritance of that access control expression. In accordance with example implementations, all access control expressions are marked as local or heritable. An inherited access control expression, in this context refers to an access control expression that is indirectly assigned to a path due to the access control expression being directly assigned to a proper prefix of the path. Each effective access control expression for a particular permission and particular location includes any access control expression(s) defined at the location as well as any heritable access control expression(s) defined from any transitive parent. An operation is allowed if the effective access control expression is satisfied.

In an example, an access control expression may be associated with a single operation, a View operation, and may be defined by a metadata packet that is located at "hdp://data/acme":

```
{
  name: View,
  perms: [hdp://role/acme/employee]],
  local: false
 },
```

If the "hdp://role/acme" role is an inherited or direct role of the requesting principal, then the access control expression is satisfied. The access control expression includes a local flag that designates whether or not the access control expression is inheritable. The value of the local flag for this example is a Boolean false, which means that the access control expression is inheritable. For the example described above, Alice inherits the "hdp://role/acme/employee" role, and therefore, Alice is permitted to view data corresponding to "hdp://data/acme" as well as descendant directories of hdp://data/acme" due to permission inheritance (as long as any other relevant permissions are satisfied). For this example, the access control expression contains a single access control list (in the "perms" field) that itself contains a single role. An access control list may contain multiple roles. Moreover, although for this example, the access control list contains a single access control list, an access control expression may contain multiple access control lists.

In another example, a local access control expression may be associated with a single operation, a View operation, and may be defined by a metadata packet that is located at "hdp://data/acme":

```
{
  name: Admin,
  perms: [["hdp://role/acme/admin"]],
  local: true
}
```

For this example, the value of the local flag is a Boolean true, so this access control expression will not be inherited by paths that have "hdp://data/acme" as a prefix. The access control list in this example, contains a single role. If the "hdp://role/acme/admin" role is an inherited role or a directly applied role of the requesting principal, then the access control expression is satisfied for requests on "hdp://data/acme" itself. A request to view a descendant directory of "hdp://data/acme", such as "hdp://data/acme/sales" would, however, not be governed by this access control expression since it is marked being as local.

As depicted in FIG. 1, in accordance with example implementations, the access rights management engine 184 and a repository 181 in which the access rights governance metadata 188 is stored are part of shared resources 180 of a computer network 100. In an example, the shared resources 180 may be cloud-based resources that are provided by a cloud service provider that provides and manages cloud services over the Internet to customers of the cloud service provider. In another example, the shared resources 180 may be located in leased spaces of co-location data center(s), and the business enterprise may serve as a provider of service instances for the business enterprise's own use. In another example, a cloud service provider other than a business enterprise may own the shared resources 180 in their own facilities or on properties owned or leased by the business enterprise, and the cloud service operator may manage and maintain the shared resources 180 for purposes of providing cloud service instances for the business enterprise.

In accordance with further implementations, the shared resources 180 may be associated with a cloud other than a public cloud or a private cloud. In an example, the shared resources 180 may correspond to a community cloud, which provides cloud services for members of a particular community group or members sharing a common interest. In another example, the shared resources 180 may correspond to a hybrid cloud, which is a mixture of two or more of a private cloud, public cloud and community cloud.

The shared resources 180 include one or multiple managed resources that may be accessed by principals using data access requests, and access to the resources is managed exclusively or in parallel with other component(s) for access management by the access rights management engine 184. For the example implementation that is depicted in FIG. 1, the managed resources include one or multiple data resources 186. In an example, a data resource 186 may be an object store. In another example, a data resource 186 may be a database or part thereof. In another example, a data resource may be all or part of a repository of unstructured and structured data, called a "data lake". In another example, a data resource 186 may correspond to a streaming data system.

In accordance with further implementations, a managed resource may be a resource other than a data resource. In examples, a managed resource may be a microservice instance; a cloud service instance; a network; specialized hardware such as a shared memory device; a shared auxiliary data processing unit, such as a graphics processing accelerator; or other resource.

For example. implementations that are described herein, a data resource 186 may store units of data, which are referred to as "datasets" herein. A particular dataset may be referenced by a logical data path. The actual location of a dataset may be represented by an identifier, such as a URL. In some cases, a managed resource might be managed as a unit rather than as a container of data.

In an example, the data resources 186 may be provided as part of a cloud-based storage service, and the data resources 186 may be part of a multi-tenant cloud service that is associated with multiple tenants. A "tenant" refers to a group of one or multiple principals that share at least one or multiple access rights. Principals of a given tenant may also have respective sets of access rights that differ among the principals. In an example, the tenants may correspond to different business organizations that share the data resources 186. In an example, a particular tenant may have sub-tenants. In an example, sub-tenants may correspond to respective units of the tenant, such as departments or divisions of the tenant.

The data resources 186, in accordance with example implementations, are associated with a namespace of URLs, such that different URLs of the namespace correspond to different datasets of the data resources 186. In accordance with example implementations that are described herein, the access rights governance metadata 188 and the data resources 186 share the same hdp://** URL namespace.

Although the namespace may be shared by multiple tenants, parts of the namespace may not be visible to principals affiliated with the tenants, as the visibility depends on access rights, as described herein. Even if visible, certain limitations may be placed on the use of those parts of the namespace. In addition to principals that are affiliated with tenants, the namespace may also be associated with a principal called a "namespace operator", such as, for example, a cloud service operator.

In the context that is used herein, a "principal" refers to an entity that may access or at least attempt to access a resource. A principal may be assigned zero, one or multiple attributes (called a "role" herein), which control the degree of access (if any) of the principal to the resources that are controlled by the access rights management engine 184.

In an example, a principal may be a human user 138 (called a "user" herein). As depicted in the example implementation of FIG. 1, users 138 may access the shared resources 180 via interactions with applications or graphical user interfaces (GUIs) that execute on processing nodes 130. In an example, a processing node 130 may be a computer platform. In examples, a computer platform may be a desktop computer, a laptop computer, a tablet computer, smartphone or other hardware processor-based device. The processing nodes 130 may communicate with the shared resources 180 via network fabric 160. In accordance with example implementations, the network fabric 160 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof.

In another example, a principal may be a workload. In this context, a "workload" refers to a set of one or multiple computing processes to perform a set of one or multiple computing tasks. As depicted in FIG. 1, in an example, a workload may be process of an application 114 (e.g., a process of a microservice). In another example, a workload may be set of application processes collectively having a single identity and running on one or multiple processing nodes 110.

Because the hdp:// URL namespace is shared with the access rights governance metadata 188, pathnames beginning with the "hdp://" prefix may reference datasets of the data resources 186, as well as reference metadata objects 193, 195, 197 and 199**.

The access rights management engine 184 may use the permission structure represented by the metadata 188 to regulate data access requests to perform operations on managed resource, such as the data resources 186. In examples, the operations may include operations to view, read from or write to the data resources 186.

The access rights management engine 184 may also use the permission structure to regulate operations that are directed to the metadata 188. In this manner, the access rights management engine 184, in accordance with example implementations, uses the metacircular properties of the metadata 188 to control operations to access, view or modify the metadata 188. In examples, the access rights management engine 184 may use the metadata 188 to regulate such operations as adding a role object to the metadata 188, removing a role object from the metadata 188, assigning an access control expression to a particular path of the metadata 188, or adding a role to an access control list to the metadata 188. In other examples, the access rights management engine 184 may use the metadata 188 to regulate whether a request may remove a role from an access control list of the metadata 188, attach a role to a particular user path of the metadata or attach a role to a particular workload path of the metadata 188. In other examples, the access rights management engine 184 may use the metadata 188 to regulate whether a request may add a principal object the metadata 188, remove a user object from the metadata 188, or remove a role from a principal path.

In accordance with example implementations, the root of the directory tree structure 190 is associated with a root prefix (e.g., "hdp://") of the hdp://** namespace. The user directory, role directory, workload directory, and data directory may be identified by paths that begin with the prefixes "hdp://user", "hdp://role", "hdp://workload", and "hdp://data", respectively.

Figure 2:
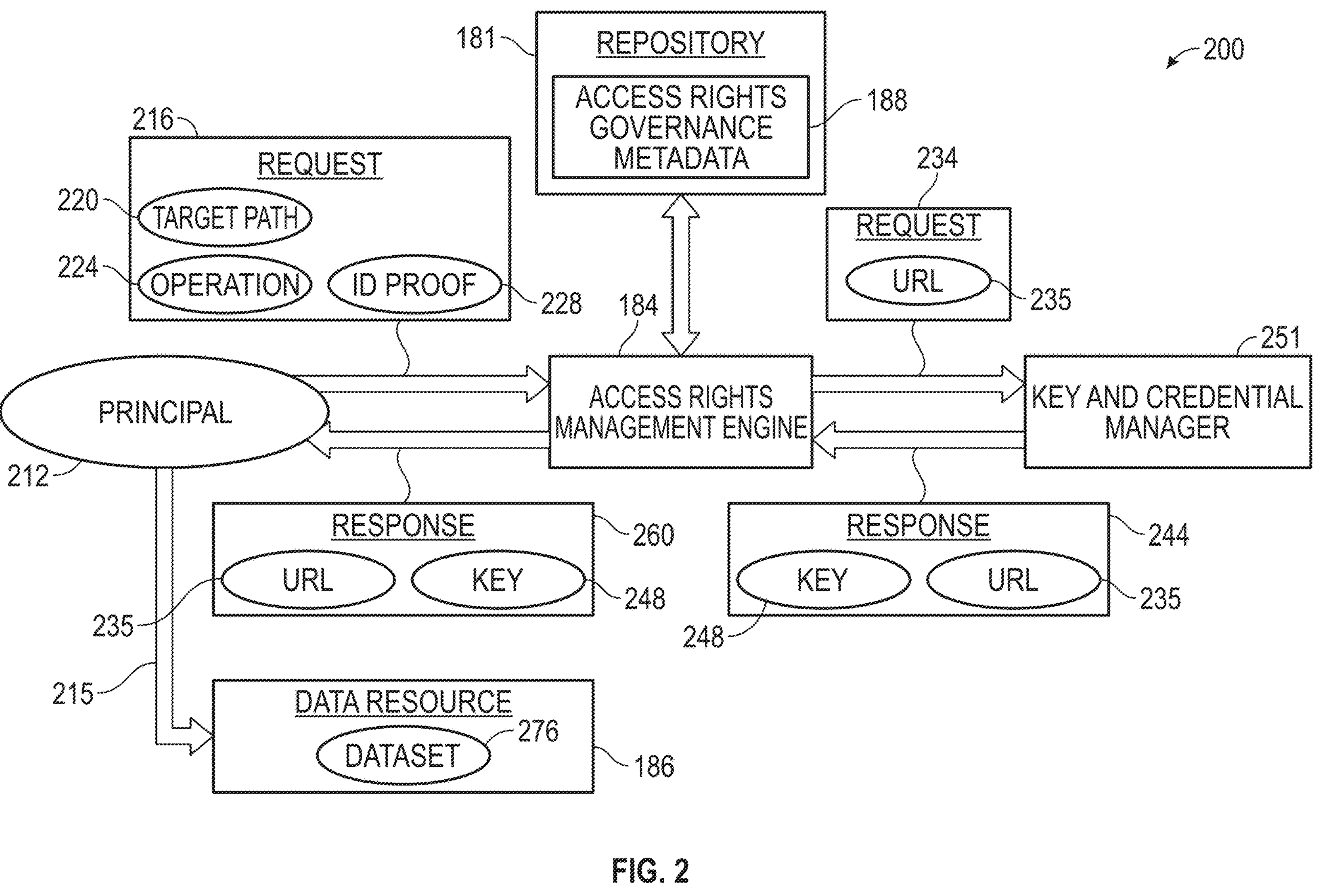
FIG. 2 is an illustration of flows associated with a principal accessing a data resource according to an example implementation.

FIG. 2 illustrates the processing of a data access request by the access rights management engine 184. Referring to FIG. 2, for this example, the access rights management engine 184 responds to a request 216 by a principal 212, a requestor, to perform a particular operation 224 on a particular dataset 276 of a data resource 186. As described further herein, the access rights management engine 184 handles a data access request (such as the request 216) differently than a request to perform an operation on the metadata 188.

As depicted in FIG. 2, the request 216 may include data that represents a proof of identity 228 for the principal 212, a target path 220 identifying the dataset 276 and the requested operation 224. In accordance with example implementations, the target path 220 is within an hdp:// namespace that is defined by the access rights management engine 184, and the target path 220 identifies a logical location of the dataset 276. After successfully validating the request 216 based on the proof of identity 228, the access rights management engine 184 evaluates whether the principal 212 has the access right(s) to perform the requested operation, and for this purpose, the access rights management engine 184 accesses the metadata 188**.

In particular, the access rights management engine 184 determines the effective role(s) of the principal 212. More specifically, the access rights management engine 184 evaluates a principal path of the metadata 188 at which a principal object corresponding to the principal 212 is stored for purposes of identifying any role(s) that are directly attached to the path. The access rights management engine 184 also evaluates proper prefixes of the principal path for purposes of identifying any role(s) that are attached to the prefix(es) and as such, are inherited roles. The combined collection of directly-attached role(s) (if any) and inherited role(s) (if any) correspond to the effective role(s) that the metadata 188 assigns to the principal 212.

The access rights management engine 184 also determines the effective access control expression(s) that control whether the requested operation 224 is permitted. More specifically, the access rights management engine 184 evaluates a data path of the metadata 188 at which a data object corresponding to the target path 220 is stored for purposes of identifying any access control expression(s) that are attached to the data path and are associated with either the requested operation 224 or a required implied operation(s). If multiple access control access expressions that are directed to the requested operation are located at the data path, the access rights management engine 184 combines the expressions into a single access control expression, which contains a conjunction of the access control lists of the multiple access control expressions. The access rights management engine 184 further evaluates proper prefixes of the data path for purpose of identifying any single access control expression(s) that are located at the proper prefixes. The access rights management engine 184 may then combine all of the single access control expressions at the data path and proper prefixes of the data path to derive an effective access control expression for the requested operation. The effective access control expression may contain multiple access control lists.

The access rights management engine 184 evaluates the effective access control expression for the requested operation for purposes of determining whether the effective access control expression is satisfied. The effective access control expression is satisfied if each access control list of the expression contains at least one effective role of the principal 212. In a similar manner, the access rights management engine 184 determines effective access control expressions for one or multiple implied operations and determining whether each of these access control expressions is satisfied.

If the access rights management engine 184 determines that any of the effective access control expression(s) are not satisfied, then the access rights management engine 184 denies the request 216 and sends a corresponding denial response to the principal 212 (not depicted in FIG. 2 because the request 216 for this example is allowed).

FIG. 2 depicts the result of all of the effective access control expression(s) being satisfied, and as such, the access rights management engine 184 proceeds with actions in furtherance of the request 216. More specifically, the access rights management engine 184 determines a location identifier within the hdp:// namespace for the requested dataset 276. In the example implementation that is depicted in FIG. 2, the location identifier is a URL 235. In accordance with example implementations, the location identifier, such as the URL 235, may be represented by a metadata packet, which is stored at the data path of the metadata 188 corresponding to the target path 220. In another example, the location identifier may be a physical address (within a corresponding physical namespace) of the dataset 276**, or an identifier corresponding to another type.

The access rights management engine 184 for this example next provides a request 234 containing the URL 235 to a key and credential manager 251 for purposes of the access rights management engine 184 acquiring a credential, which allows the principal 212 to access the dataset 276. As depicted in FIG. 2, the key and credential manager 251 returns a response 244 to the access rights management engine 184, which contains the URL 235 and a time-limited cryptographic key 248 (i.e., a cryptographic key having a built-in expiry time) for accessing the dataset 276. In accordance with further implementations, a time-limited credential other than a cryptographic key may be used to authorize access to the requested dataset 276. For example, in further implementations, the credential may be an authorization bearer token, such as a JavaScript Object Notation (JSON) web token, or "JWT", that includes an identifier for the principal 212 in the payload of the JWT. In an example, the time that a credential is valid may correspond to a duration of a JWT. Regardless of the particular form of the credential, the credential may have a relatively short life (e.g., a life of less than a minute or another time limit) before the credential is invalid.

The access rights management engine 184 next provides a response 260 to the principal 212 corresponding to the granting of the request 216. The response 260 includes the URL 235 and the cryptographic key 248. The principal 212 may then access the requested dataset 276 to perform the requested operation using the acquired URL 235 and cryptographic key 248. As depicted in FIG. 2, this access occurs using a separate communication path 215, which does not involve the access rights management engine 184.

Referring back to FIG. 1, the access rights management engine 184 handles requests for operations on the metadata 188 differently from data access requests. In response to a request, from a requestor, for an operation on the metadata 188, the access rights management engine 184 first determines whether the metadata 188 indicates all of the permissions that are required for the requested operation. These permissions include permission for the requested operation, as well as permission(s) for any implied operation(s). If the access rights management engine 184 determines that the metadata 188 indicates all of the required permissions, then the access rights management engine 184 performs these operations and returns a response to the requestor representing that the requested operation has been performed. If the access rights management engine 184 determines that the metadata 188 does not indicate all of the required permissions, then the access rights management engine 184 denies the request and returns a failure response to the requestor.

In accordance with example implementations, the access rights management engine 184 may process requests that are associated with one of the following operations: a Write operation, a Read operation, an Admin operation, an ApplyRole operation, a UseRole operation or a View operation. Either a data access request or request for an operation on the metadata 188 may specify a Write operation. A Write operation on the data resource 186 may involve, as examples, modifying a dataset, replacing a dataset, or adding a subdirectory to extend a particular path. In an example, for a principal to write a dataset to a target path of a data resource 186, the principal must have permission for a Write operation on the path of the corresponding metadata data object 199. A Write operation to the metadata 188 may, as examples, involve adding an access control expression, adding a metadata object, creating a particular path of the metadata 188 or deleting a particular path of the metadata 188. The Admin operation is an implicit operation for a Write operation on the metadata 188. The Admin operation limits the creation and deletion of paths of the metadata 188. In an example, for a principal to write data to a metadata path, the principal must have permission for a Write operation on the metadata path and permission for an implicit Admin operation on the metadata path.

Either a data access request or request for an operation on the metadata 188 may specify a Read operation. A Read operation on a data resource 186 may, as examples, involve reading a dataset or reading the content of a particular directory. The View operation is an implicit operation for a Read operation. In an example, for a principal to read a dataset from a target path of a data resource 186, the principal must have permission for a Read operation on the corresponding path of the metadata data object 199 and permission for an implicit Admin operation on the path of the metadata data object 199. A Read operation to the metadata 188 may, as examples, involve reading an access control expression, reading a metadata object, or viewing the content of a particular directory of the metadata 188. The Admin operation and View operation are implicit operations for a Read operation on the metadata 188. In an example, for a principal to read from a metadata path, the principal must have permission for a Read operation on the metadata path, permission for a View operation on the metadata path and permission for an implicit Admin operation on the metadata path.

A request on the metadata 188 may specify an ApplyRole operation and if allowed, applies a role to a user path or workload path of the metadata. The Admin operation and View operation are implicit operations for the ApplyRole operation. For a principal to apply a role to a path, the principal must have a permission for an ApplyRole operation on the role and have a permission for an ApplyRole operation on the path. Moreover, the principal must have permission for an Admin operation on the path; and the principal must have permissions for a View operation on both the role and the path.

A request on the metadata 188 may specify a UseRole operation and if allowed, adds or remove a role from an access control list within an access control expression. The Admin operation and View operation are implicit operations for the UseRole operation. For a principal to add or remove a role from an access control list of an access control expression, the principal must have permissions for the UseRole operation on all of the roles in the access control list. In addition, the principal must have permission for the Admin operation on the path where the access control expression is found, as well as permissions for the View operation on all of the roles in the access control list and permission for the View operation on the path where the access control expression is found.

To summarize, for the metadata 188 to indicate that a particular request is permitted, the metadata 188 may need to indicate permissions for multiple operations, including the requested operation and one or multiple required implicit operations. Moreover, in order for a given operation to be permitted, multiple permissions in different respective paths of the metadata 188 may be required.

Figure 3:
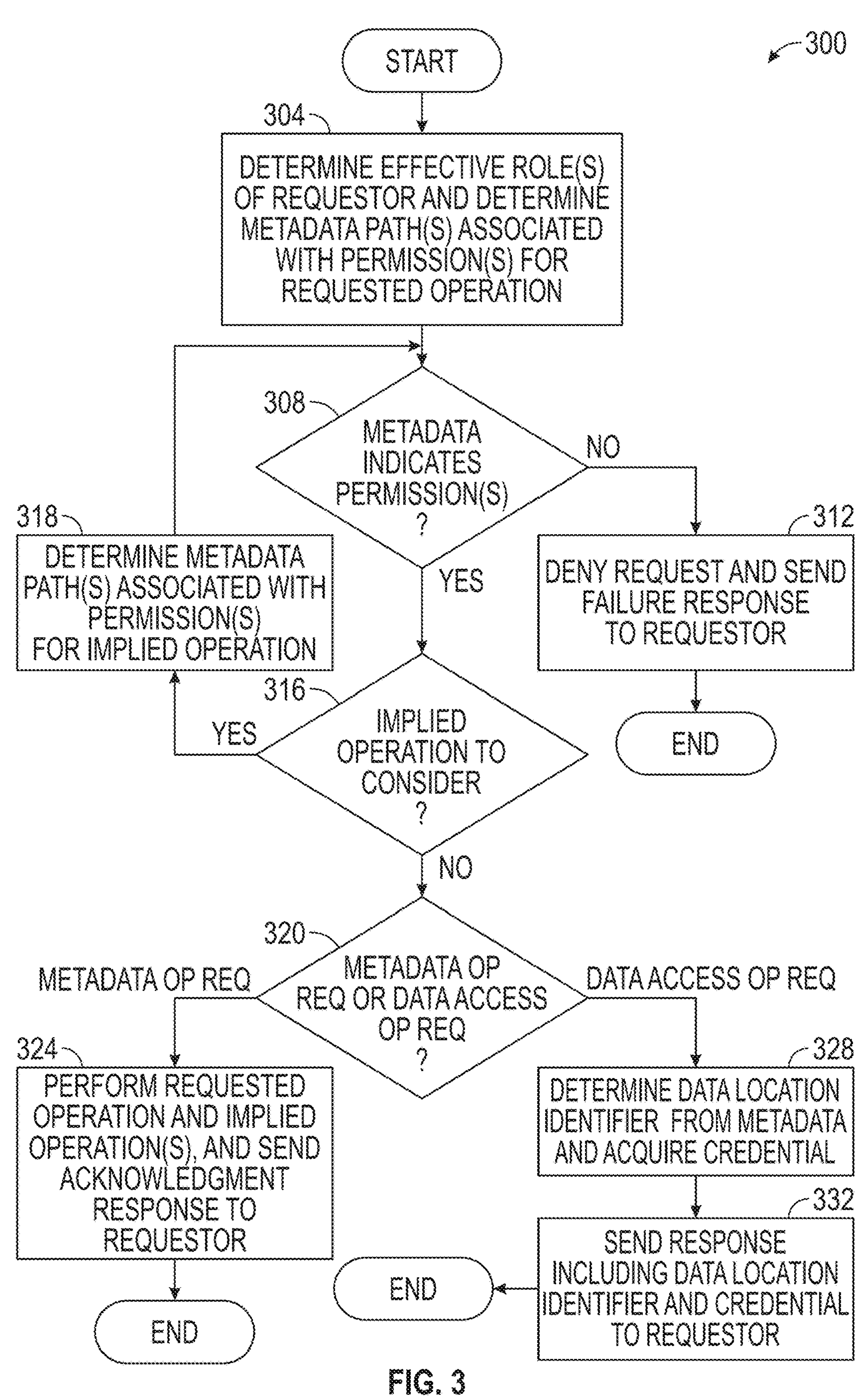
FIG. 3 is a flow diagram illustrating a technique used by an access rights management engine to respond to a request according to an example implementation.

FIG. 3 depicts an example technique 300 that may be used by an access rights management engine, such as the access rights management engine 184 of FIG. 1, to respond to a request, in accordance with example implementations. The discussion of FIG. 3 below refers to the processing of two example requests by the technique 300. The first example request processed by the technique 300 is a read request directed to reading a dataset of a managed data resource, such as the data resource 186 of FIG. 1. The second example request processed by the technique 300 is a request directed to an operation on access rights governance metadata, such as the metadata 188 of FIG. 1, and more specifically, a request to apply a role to a user path of the metadata. Although the technique 300 first includes determining whether the metadata indicates the required permission(s) for the requested operation and then determining whether the metadata indicates the permission(s) for one or multiple implied operations, the permissions may be determined in any order. Moreover, as can be appreciated, some parts of the technique 300 may be performed in parallel, instead of being determined sequentially. For example, in further implementations, the technique 300 may include determining the permissions for different operations using respective parallel processes.

Referring to FIG. 3, the technique 300 includes the access rights management engine determining (block 304) the effective role(s) of the requestor (the principal) and determining the metadata path(s) that are associated with permission(s) for the requested operation. For the example request to read a dataset from a managed data resource, the requested operation is a Read operation, and the metadata path that is associated with permissions for the Read operation is a metadata data path that corresponds to the dataset and begins with the prefix "hdp://data". For the example request to add a role to a user path, the requested operation is an ApplyRole operation, and the metadata paths that are associated with the permissions for the ApplyRole operation are the metadata path of the role being added (beginning with the prefix "hdp://role") and the user path (beginning with the prefix "hdp://user") to which the role is being added.

Pursuant to decision block 308, the technique 300 includes the access rights management engine determining whether the metadata indicates permission for the requested operation. This determination may include determining and evaluating one or multiple effective access control expressions at one or multiple metadata paths.

For the example request to read a dataset from a managed data resource, decision block 308 includes determining, for the metadata path corresponding to the dataset, an effective access control expression (if any) corresponding to the Read operation. If the effective access control expression exists, then decision block 308 further includes evaluating the effective access control expression in view of the effective roles to determine if the effective access control expression is satisfied. If the access control expression is satisfied, then the metadata indicates permission for the Read operation. Otherwise, the metadata does not indicate permission for the Read operation.

For the example request to add a role to a user, decision block 308 determines whether the metadata indicates two permissions for the ApplyRole operation at two different respective metadata paths: a path of the role being added, and a path of the user at which the role is being added. Decision block 308 includes determining, for the metadata path corresponding to the role being added, an effective access control expression (if any) corresponding to the ApplyRole operation. If the effective access control expression exists, then decision block 308 further includes evaluating the effective access control expression in view of the effective roles to determine if the effective access control expression is satisfied. If the access control expression is satisfied then the metadata indicates a first permission of the two permissions. Decision block 308 further includes determining an effective access control expression (if any) at the path of the user to which the role is being added. If the effective access control expression exists, then decision block 308 further includes evaluating the access control expression in view of the effective roles to determine if the access control expression is satisfied. If this access control expression is satisfied, then the metadata indicates the second permission of the two permissions. If the metadata indicates both the first and second permissions, then the metadata indicates overall permission for the ApplyRole operation. Otherwise, the metadata indicates that the ApplyRole operation is not allowed.

If the metadata does not indicate permission for the requested operation, then the access rights management engine denies the request and sends a failure response to the requestor, pursuant to block 312. Otherwise, if the metadata indicates permission for the requested operation, then control proceeds to decision block 316.

In decision block 316, the access rights management engine determines whether a first (or another) implied operation is to be considered. If so, then the technique 300 includes determining (block 318) the metadata path(s) associated with the permission(s) for the implied operation and determining (block 308) whether the metadata indicates overall permission for the implied operation.

For the example request to read a dataset from a managed data resource, the implied operation is a View operation. Decision block 308 for this iteration includes determining, for the metadata path corresponding to the dataset, an effective access control expression (if any) corresponding to the View operation. If the effective access control expression exists, then decision block 308 further includes evaluating the effective access control expression in view of the effective roles to determine if the effective access control expression is satisfied. If the access control expression is satisfied, then the metadata indicates permission for the View operation. Otherwise, the metadata does not indicate permission for the View operation.

For the example request to apply a role to a user, there are multiple implied operations, with the permission for each implied operation being evaluated in each iteration of the loop defined by blocks 308, 316 and 318. For example, an implied operation is a View operation, and block 308 may include determining whether an effective access control expression at the metadata path corresponding to the role being added indicates permission for a View operation. Block 308 may further include determining whether an effective access control expression at the metadata path corresponding to the path at which the role is being added indicates permission for a View operation. If the metadata indicates both permissions, then the metadata indicates overall permission for the View operation. Otherwise, the metadata does not indicate overall permission for the View operation.

For the example request to apply a role to a user, the Admin operation is another implied operation evaluated by an iteration of decision block 308. For this evaluation, decision block 308 includes determining whether an effective access control expression at the metadata path corresponding to the path at which the role is being added indicates permission for the Admin operation.

If the metadata does not indicate permission for any of the requested and implied operation(s), then the access rights management engine denies the request and sends a failure response to the requestor, pursuant to block 312. Otherwise, after the iterations for evaluating all of the operation permissions required for the request are complete (and a determination has been made that the metadata indicates all permissions), control proceeds to decision block 320.

Decision block 320 represents a logical branch corresponding to how the access rights management engine handles data access requests differently from requests that are directed to operations on the metadata. If the requested operation is directed to the metadata, then, pursuant to block 324, the access rights management engine performs the requested operation and any implied operation(s) and sends an acknowledgement response to the requestor. For the example request to add a role to a user, block 324 includes the access rights management engine modifying the metadata to add the role to the user and sending an acknowledgment response to the requestor indicating that the role has been added.

If the requested operation is directed to data access, then the access rights management engine, pursuant to block 328, determines a location identifier from the metadata and acquires a credential for the data access. For the example request to read a dataset from a managed data resource, block 328 includes the access rights management engine reading a metadata packet at the metadata path corresponding to the dataset to determine a location identifier (e.g., a URL) for the dataset. Moreover, block 328 may include the access rights management engine requesting a credential, such as a a time-limited cryptographic key, from a key and credential manager. Pursuant to block 332, the access rights management engine sends, to the requestor, a response that includes the data location identifier and the credential. For the example request to read a dataset from a managed data resource, the requestor may then use the location identifier and credential to read the dataset.

Referring back to FIG. 1, among its other features, the shared resources 180 may include one or multiple processing nodes 182. In an example, a processing node 182 may be a computer platform, such as a blade server, a rack server or other processor-based platform. The processing node 182 includes one or multiple hardware processors 185 and a memory 199. In an example, a hardware processor 185 may include one or multiple central processing unit (CPU) cores.

In another example, a hardware processor 185 may include one or multiple semiconductor CPU packages (or "sockets").

The memory 199 includes non-transitory storage media that may be formed from semiconductor storage devices, memristor-based storage devices, magnetic storage devices, phase change memory devices, a combination of devices of one or more of these storage technologies, and so forth. The memory 199 may represent a collection of memories of both volatile memory devices and non-volatile memory devices.

In an example one or multiple hardware processors 185 on one or multiple processing nodes 182 may execute machine-readable instructions, such as machine-readable instructions 189 that are stored in the memory 199, for purposes of providing one or multiple software components of the shared resources 180, such as the access rights management engine 184 and/or the key and credential manager 197. In accordance with further implementations, a hardware processor 185 may be a hardware circuit that does not execute machine-executable instructions, such as an application specific integrated circuit (ASIC), field programmable gate array (FPGA), programmable logic device, a programmable logic device (PLD), or other hardware dedicated to providing one or multiple functions for the shared resources 180.

In accordance with example implementations, the repository 181 that stores the metadata 188 may be a collection of storage nodes. In an example, the repository 181 may be a fault tolerant cluster of storage nodes. In another example, the repository 181 may be a cluster of storage nodes, such as a Raft cluster, that uses a consensus algorithm to reach agreements among the storage nodes.

In accordance with some implementations, the access rights management engine 184 includes one or multiple permission managers 193. In accordance with example implementations, a permission manager 193 is a front-end process that performs the work of evaluating whether the metadata 188 authorizes requests to access the metadata 188 and data resources 186. For an authorized request to access a dataset of the data resource 186, the permission manager 193 communicates with the key and credential manager 197 to retrieves a location identifier of the dataset, retrieves the corresponding credential, and reply to the requestor with the location identifier and the credential.

For an authorized request to modify the metadata 188, metadata backend managers 191 of the access rights management engine 184 perform actions to maintain a globally-consistent view of the metadata 188. In accordance with example implementations, the backend managers 191 add and update metadata packets to the metadata 188 atomically, and the backend managers 191 maintain a serialized log of all atomic updates to the metadata 188. The log, in accordance with example implementations, defines the order of all changes, and the backend managers 191 assign each update a global transaction number. Moreover, in accordance with example implementations, each metadata packet has its own packet-level version number as well. The backend managers 191 use the packet-level version number to allow consistent read-modify-write operations on metadata packets by recording the packet-level version number when the packet is read and then using that packet-level version number when data is written back. In accordance with example implementations, the backend managers 191 use special packet-level version numbers (e.g., numbers such as 0, 1, 2, 3, and so on) to signal the creation of a new metadata packet and the unconditional update of a new or existing object, respectively.

In accordance with example implementations, the metadata backend manager 191 is a backend process that maintains a globally consistent view of the metadata 188. The metadata backend manager 191 checks the packet-level version numbers to allow consistent updates of the metadata 188. The permission managers 193, in accordance with example implementations, subscribe to the metadata store and receives updates.

In accordance with example implementations, time tick transactions are inserted at a relatively high rate (e.g., one to ten per second) to allow the permission managers 193 to quickly detect if their connection to the metadata backend has been interrupted. In accordance with example implementations, the principals retain the last global transaction number so that if the principal reconnects to a different permission manager 193, the new permission manager 193 can ensure that the principal is not exposed to any regression in the metadata state. In accordance with example implementations, there may be multiple backend managers 191 that maintain a quorum. If the quorum of metadata backend managers 191 breaks down, operations may continue except for metadata mutations. This means that a highly available, globally-consistent metadata backend can continue at full speed for almost all operations even for a large-scale network partition.

Figure 4:
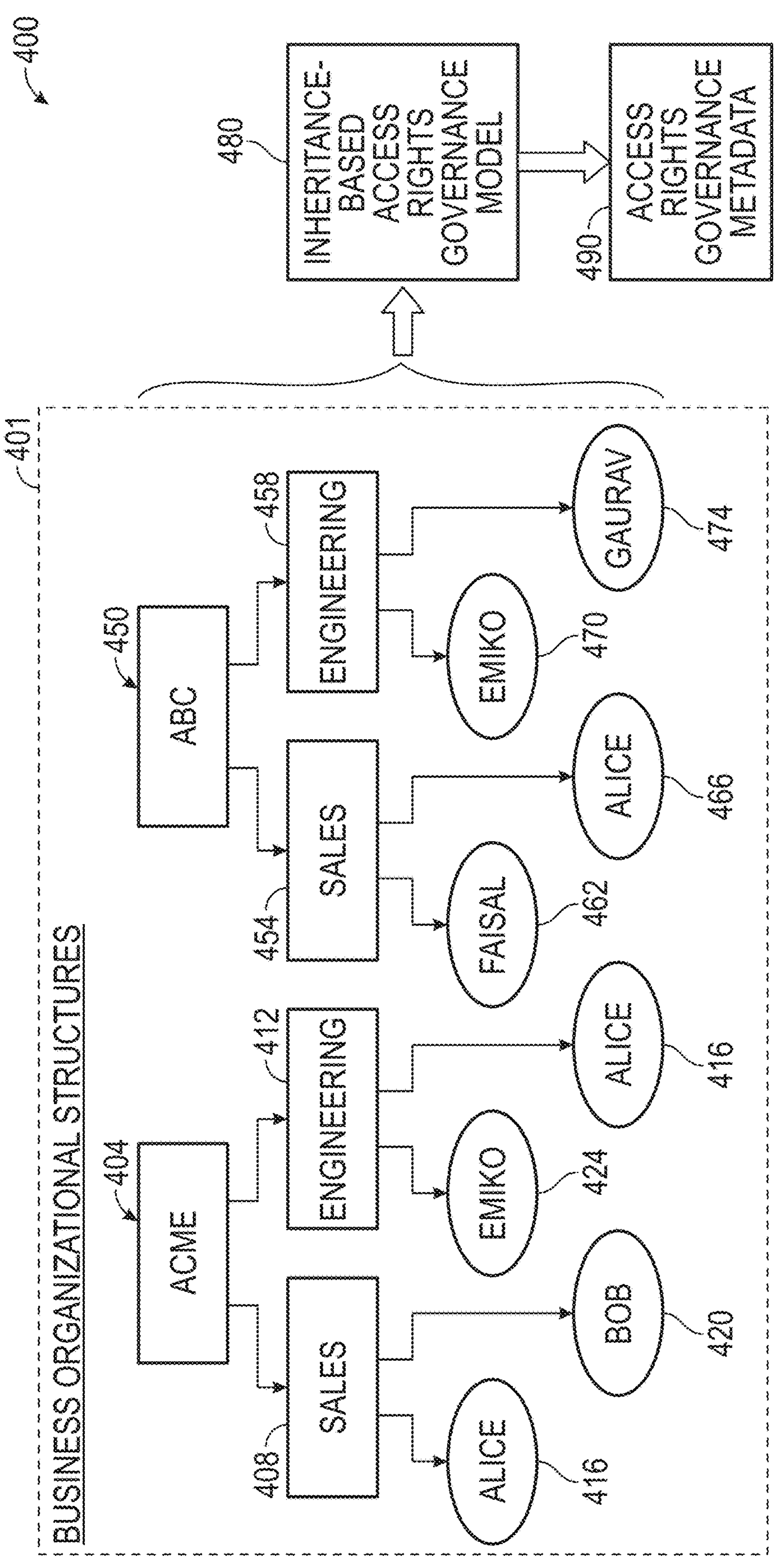
FIG. 4 illustrates application of an inheritance-based access rights governance model to derive a permission structure to control access rights for a namespace that is shared by multiple tenants, according to an example implementation.

FIG. 4 is an illustration 400 of an inheritance-based access rights governance model 480 being applied to configure access control governance metadata 490 (called "metadata 490" herein) for two companies, ACME and ABC, which are respective tenants of the same multi-tenant namespace. FIG. 4 depicts business organizational structures 401, including a business organizational structure 404 for ABC and a business organizational structure 450 for ACME. The permission structure that is created by the metadata 490 allows ACME and ABC to share the same namespace, while isolating subspaces used by the respective companies and preventing the companies from interfering with each other.

As can be seen from its business organizational structure 404, ACME has a sales division 408 and an engineering division 412. In a similar fashion, as can been seen from ABC's business organizational structure 450, ABC also 450 has a sales division 454 and an engineering division 458. A particular challenge with multi-tenancy is that there will inevitably be named collisions on many different levels. For this example, both companies have sales and engineering departments, which, if not for the features of the metadata 490, may lead to corresponding namespace conflicts.

Alice 416 and Bob 420 work in ACME's sales department 408, and Emiko 424 and Alice 416 work in ACME's engineering department 412. Faisal 462 and Alice 466 work in ABC's sales department 454; and Emiko 470 and Gaurav 474 work in ABC's engineering department 458. For this example, ACME and ABC have employee names that may otherwise conflict in the shared namespace, if not for the features of the metadata 490. For example, as depicted at 416 and 466, Alice is the first name of employees of ACME and ABC. As another example, as depicted at 424 and 470, Emiko is the first name of employees of ACME and ABC. Another potential for a namespace conflict is an employee that works in different divisions or departments of the same company. For this example, for ACME, Alice 416 works in both the sales department 408 and the engineering dependent 412.

A namespace operator (e.g., a cloud service operator associated with a multi-tenant cloud service) is responsible to provide each tenant of the namespace with initial access to the namespace. The namespace operator, in general, is allowed to see which companies, or tenants, exist. However, the namespace operator, for this example, is not allowed to see or manipulate any data or configuration for either tenant.

In addition to providing tenant isolation, restricting namespace operator access and preventing namespace collisions, the metadata 490 also allows the namespace operator to delegate access rights to the tenants so that each tenant may manage its respective namespace. Moreover, through access rights inheritance, the overall corporate constraints for each tenant are satisfied.

Additionally, the namespace operator may be invited back into the permission structure for purposes of facilitating collaboration among tenants. For example, ACME and ABC may enter into a joint venture and desire to have access rights to a common subspace. ACME and ABC may each invite the namespace operator back into the permission structure by assigning rights to the namespace operator to allow the namespace operation to set up the common subspace for the joint venture.

Figure 5A:
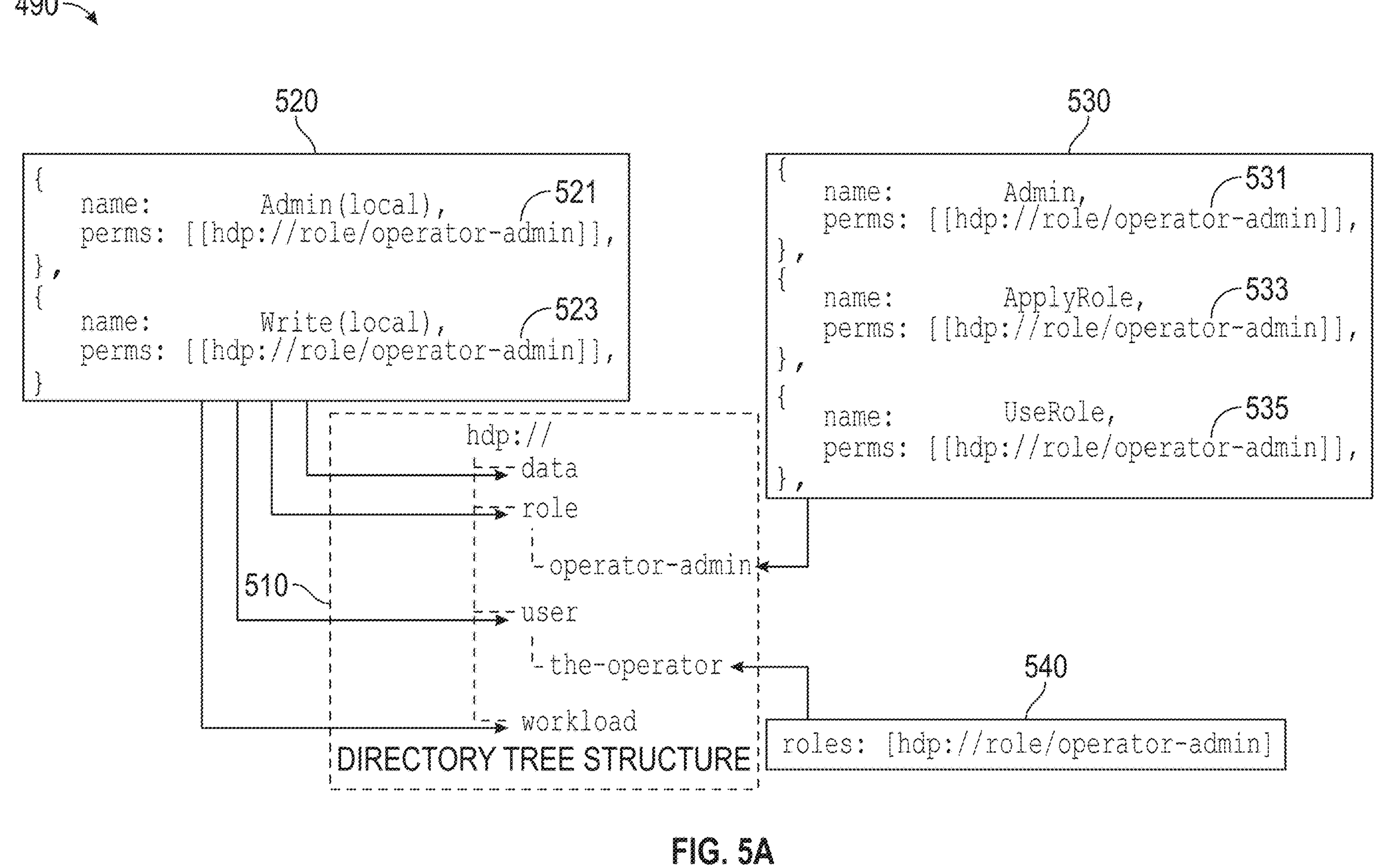
FIG. 5A depicts an example initial state of the permission structure of FIG. 4 after the permission structure is prepared by a namespace operator to allow the addition of tenants to the namespace, according to an example implementation.

FIG. 5A illustrates the metadata 490 in an initial state prepared by the namespace operator. More specifically FIG. 5A depicts a metadata directory tree structure 510 having the following four top level directories corresponding to four based metadata object types: an "hdp://data" directory, an "hdp://role" directory, an "hdp://user" directory and an "hdp://workload" directory.

The namespace operator has a user name of "the-operator" and corresponds to a user object that is stored in the path "hdp://user/the-operator". As depicted at 540, a role of "hdp://role/operator-admin" is attached to the path "hdp://user/the-operator". Stated differently, the metadata 490 assigns the name space operator the role of "operator-admin".

In its initial state, the metadata 490 assigns the hdp://role/operator-admin role permissions, which allow the namespace operator to set up sub-spaces for respective tenants. For example, as depicted at 520, in preparing the namespace, the namespace operator stores local access control expressions 521 and 523 at each of the "hdp://data", "hdp://role", "hdp://user", and "hdp://workload" paths. Being local, the access control expressions 521 and 523 are not inherited.

The local access control expression 521 assigns the "hdp://role/operator-admin" role permission for Write operations directed to hdp://data ", "hdp://role", "hdp://user", and "hdp://workload" paths. The local access expression 523 assigns the "hdp://role/operator-admin" role permission for Admin operations directed to the hdp://data ", "hdp://role", "hdp://user", and "hdp://workload" paths. Although not depicted in FIG. 5A, in accordance with some implementations, the namespace operator may further store local access control expressions at the hdp://data ", "hdp://role", "hdp://user", and "hdp://workload" paths assigning permission to the "hdp://role/operator-admin" permission for View operations directed to the hdp://data, hdp://role, hdp://user and hdp://workload paths. The result of these local access control expressions is that the metadata 490 allows the namespace operator to write to the hdp://data ", "hdp://role", "hdp://user", and "hdp://workload" paths to set up subdirectories for tenans.

In an example, with the local access control expressions in place, the namespace operator may set up directories for ACME corresponding to the following paths: "hdp://data/acme", "hdp://role/acme", "hdp://user/acme", and "hdp://workload/acme". In another example, with the local access control expressions in place, the namespace operator may set up directories for ABC corresponding to the following paths: "hdp://data/abc", "hdp://role/abc", "hdp://user/abc", and "hdp://workload/abc".

The initial preparation of the namespace by the namespace operator may further include, as depicted at 530, the namespace operator assigning inheritable permissions to the "hdp://role/operator-admin" role. More specifically, the namespace operator stores inheritable access control expressions 531, 533 and 535 at the "hdp://role/operator-admin" path.

Figure 5B:
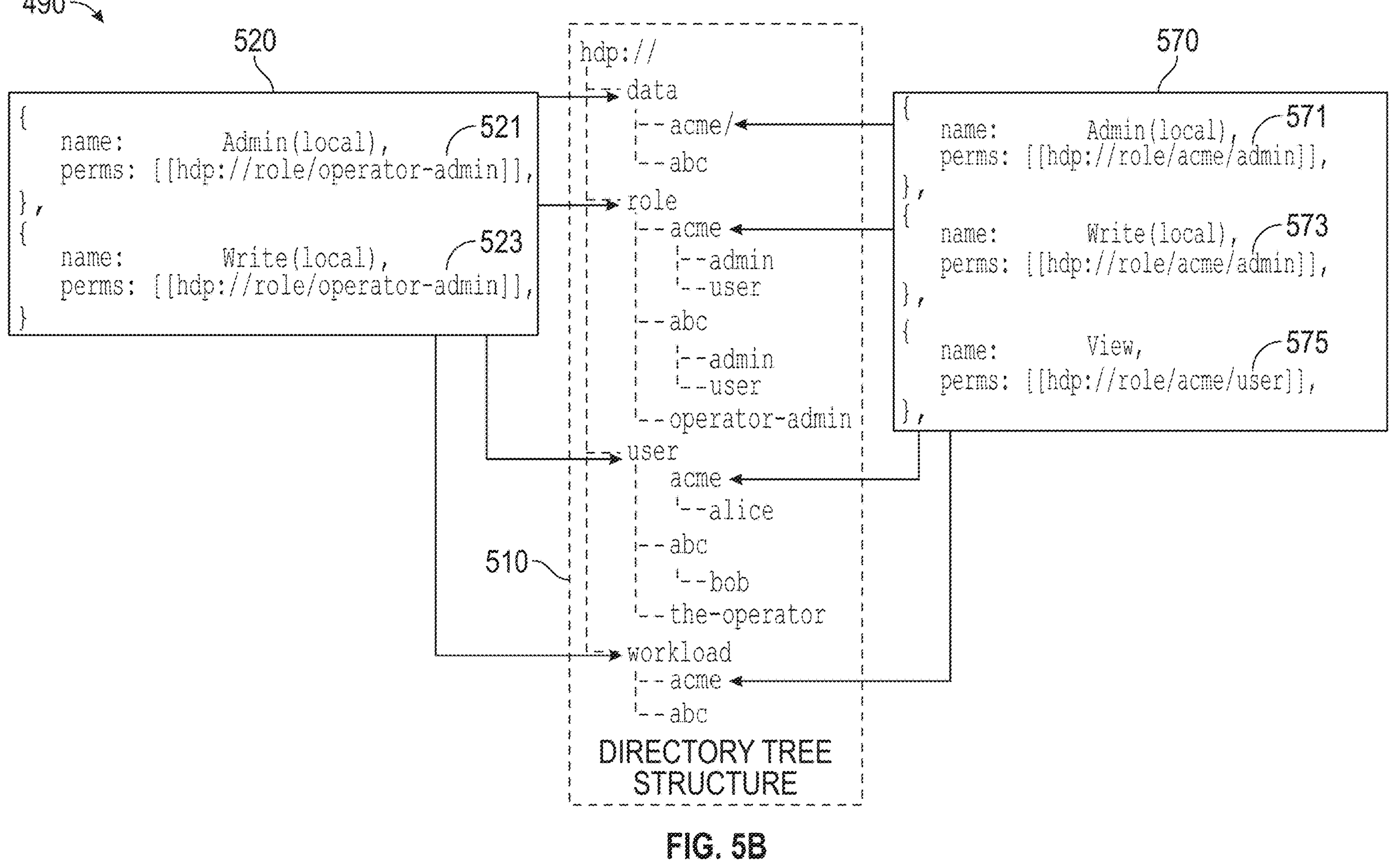
FIG. 5B depicts a further state of the permission structure of FIG. 4 illustrating the delegation of tenant access rights according to an example implementation.

The permissions created by the access control expressions 531, 533 and 535 is puts in place the permissions for the namespace operator to create permissions for tenant operator roles for the tenants. For example, FIG. 5B depicts a further state of the metadata 490 illustrating the namespace operator setting up "hdp://data/acme", "hdp://role/acme", "hdp://user/acme", and "hdp://workload/acme" paths for the tenant ACME. As depicted at 570, in each of these paths, the namespace operator stores access control expressions 571, 573 and 575 that assign permissions to a tenant operator role ("hdp://role/acme/admin") for ACME. The four access control expressions 571 assign non-inheritable permissions for an Admin operation for the "hdp://role/acme/admin" role to the "hdp://data/acme", "hdp://role/acme", "hdp://user/acme", and "hdp://workload/acme" paths. The four access control expressions 573 assign non-inheritable permissions for an Write operation for the "hdp://role/acme/admin" role to the "hdp://data/acme", "hdp://role/acme", "hdp://user/acme", and "hdp://workload/acme" paths. The four access control expressions 575 assign inheritable permissions for an View operation for the "hdp://role/acme/admin" role to the "hdp://data/acme", "hdp://role/acme", "hdp://user/acme", and "hdp://workload/acme" paths.

With these permissions and roles in place, a user of ACME with the op-admin role may undertake operations to properly set up the portion of the permission structure corresponding to ACME so that the portion of the permission structure complies with ACME's overall corporate compliance restraints. The operations may include any of the operations described herein, such as operations to add metadata packets, write metadata objects, create access control expressions, add roles to access control expressions, as well as other operations. Moreover, the operations may include operations in which the user with the op-admin role delegates access rights to other ACME users. in which the user with the op-admin role creates sets up metadata paths. Due to the access rights inheritance provided by the metadata the overall corporate constraints are satisfied.

With the initial roles and permissions that are prepared by the namespace operator, only the user of ACME with the op-admin role can initially make any changes to the namespace or role assignments. Moreover, no one at ACME except the user with the op-admin role can even see that the namespace operator even exists. Paradoxically, however, any user of ACME may include the namespace operator in an access control expression to invite the namespace operator back into the permission structure (e.g., for purposes of a joint venture). Additionally, no principal of ACME can see a portion of the namespace associated with another tenant, such as ABC. Due to the access rights inheritance provided by the metadata the overall corporate constraints are satisfied.

Although not depicted in the figures, the namespace operator may, in a similar manner, configure the metadata 490 with permissions and roles to allow another tenant, such as ABC, to have initial access to the namespace.

Figure 6:
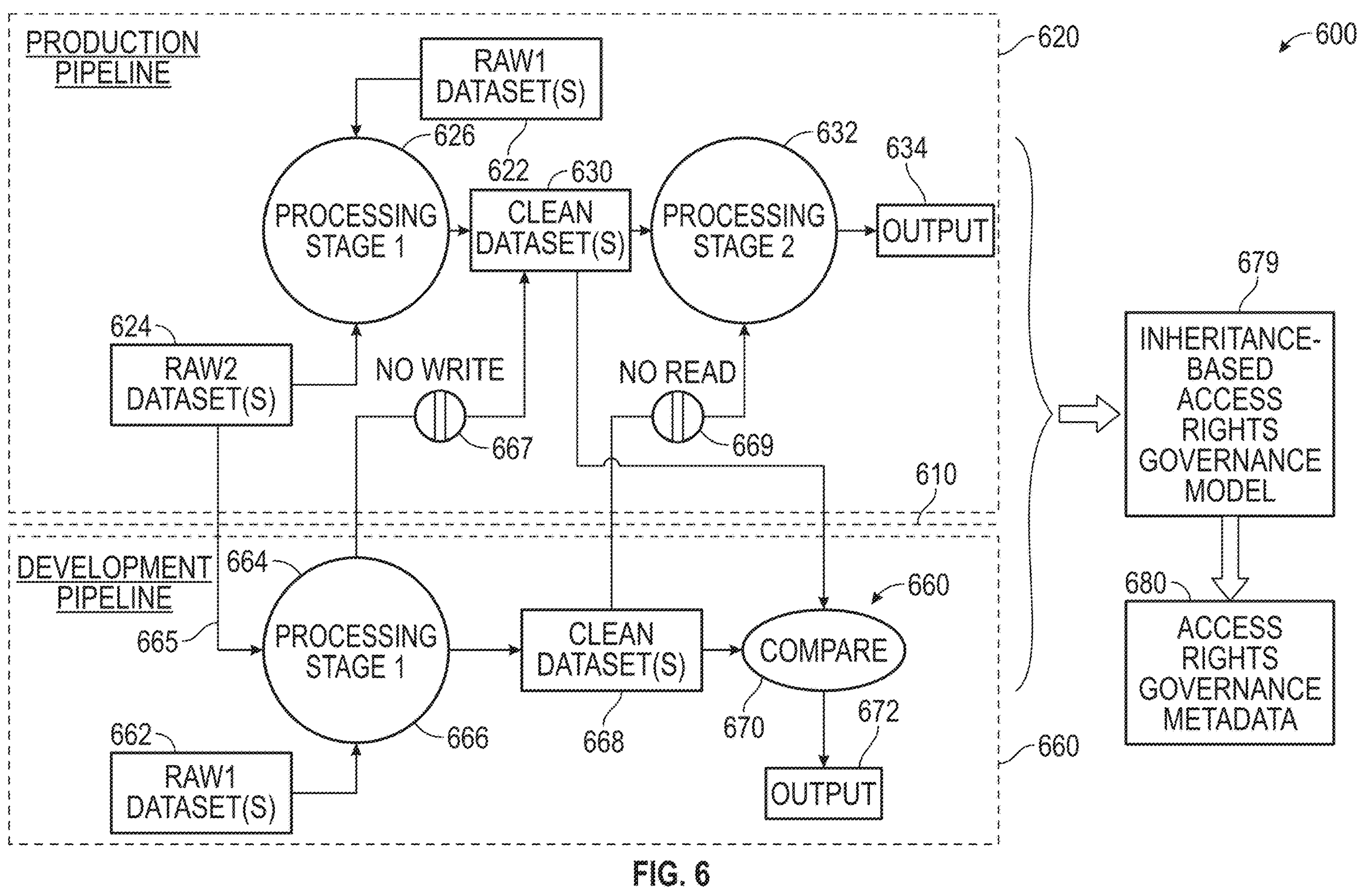
FIG. 6 illustrates application of an inheritance-based access rights governance model to derive a permission structure to control access rights associated with related production and development pipelines, according to an example implementation.

FIG. 6 is an illustration 600 of an inheritance-based access rights governance model 679 being applied to create access rights governance metadata 680 (herein called "the metadata 680") for purposes of setting up access rights to constrain interactions between production 620 and development 660 pipelines. The metadata 680 contains workload objects correspond to workloads. For this example, the workloads correspond to components (called "stages") of the production 620 and development 660 pipelines. The metadata 680 also contains user objects corresponding to users. For this example, production 620 and development 620 pipelines correspond to ACME, and the users are, for example, ACME employees. The metadata 680 also contains role objects corresponding to roles. For this example, the roles may include a production pipeline role, a development pipeline role and a user role. The metadata 680 also contains data objects correspond to respective dataset collections. For this example, the dataset collections include a first raw dataset collection 622, a second raw dataset collection 624, a clean dataset collection and an output 634 of the production pipeline 620; and the dataset collections include a first raw dataset collection 662, a clean dataset collection 668 and an output 672 of the development pipeline 660.

The production pipeline 620 corresponds to the production version of a deployed software product or service, or a part thereof. The development pipeline 660 corresponds to an environment to develop or redesign one or multiple components of the production pipeline 620 without corrupting or polluting the output of the production pipeline 620.

For this example, the production pipeline 620 includes a first processing stage 626 that processes the first raw dataset collection 622 and the second raw dataset collection 624 for purposes of producing the clean dataset collection 630. A second processing stage 632 of the production pipeline 620 processes the clean dataset collection 630 for purposes of producing the output 634.

The development pipeline 660 works on a redesign, or modification, of the production pipeline's first processing stage 626. More specifically, the development pipeline 660 includes a first processing stage 666 (called "the component under development" herein) which corresponds to a different version of the first processing stage 626 of the production pipeline 620. As shown, for purposes of providing the clean dataset collection 668, the first processing stage 666 processes the first raw dataset collection 662 and processes the second raw dataset collection 624 from the production pipeline 620. The development pipeline 660 includes a comparison stage 670 that compares the clean dataset collection 630 of the production pipeline 620 with the clean dataset collection 668 of the development pipeline 660 for purposes of producing the output 672, which represents a result of the comparison.

A key factor in properly constraining behaviors of the production 620 and development 660 pipelines is to allow the component under development (the first processing stage 666) to read (as depicted at 665) the second raw dataset collection 624 of the production pipeline 620 but not allow the component under development to pollute the production output 634. A no write constraint 667 illustrates the component under development (the first processing stage 666 of the development pipeline 660) being restricted from writing to the clean dataset collection 630 of the production pipeline 620 (which, if allowed, would pollute the production output 634). Another key factor in in properly constraining behaviors of the production 620 and development 660 pipelines is to ensure that the components of the production pipeline 620 cannot see any development-level data so that there is an assurance that all data in production was only ever the product of production-qualified pipeline components running on production data. A no read constraint 669 illustrates the second processing stage 632 of the production pipeline 620 being restricted from reading from the clean dataset collection 668 of the development pipeline 660 (which, if allowed, would violate the assurance that production-qualified pipeline components only run on production data).

Figure 7:
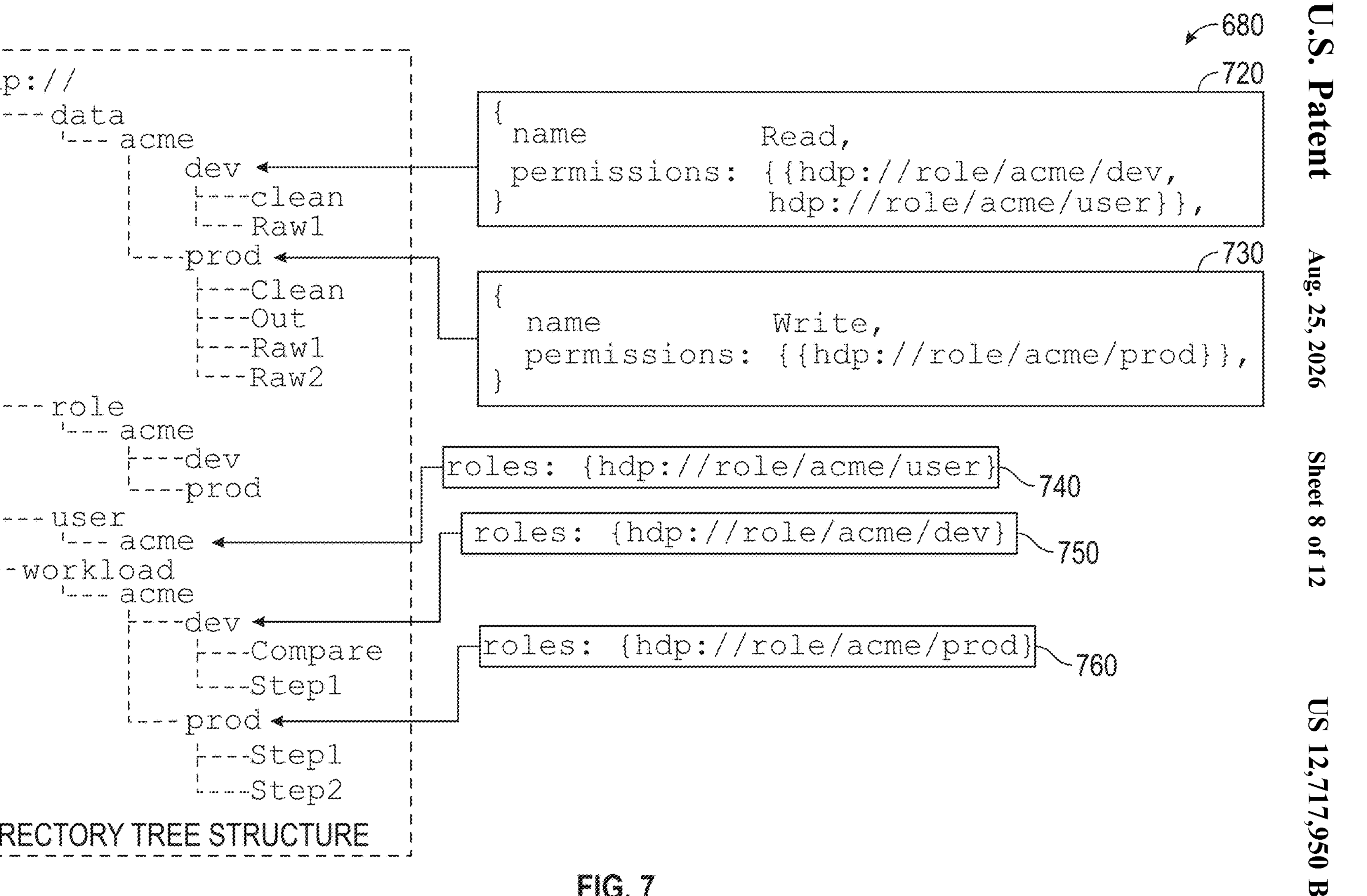
FIG. 7 depicts the permission structure of FIG. 6 according to an example implementation.

Referring to FIG. 7, which illustrates the metadata 680 in conjunction with FIG. 6, a directory tree structure 716 of the metadata 680 includes a path "hdp://data/acme/dev" that is associated with the data of the development pipeline 660 and serves as a path prefix for data objects that are associated with the development pipeline 660. More specifically, the metadata 680 includes a path ("hdp://data/acme/dev/clean") for a data object corresponding to the clean dataset collection 668 and a path ("hdp://data/acme/dev/raw1") for a data object corresponding to the first raw stage dataset collection 662.

The metadata 680 further includes a path "hdp://data/acme/prod" that is associated with the data of the production pipeline 620 and serves as a path prefix for data objects that are associated with the production pipeline 620. More specifically, the metadata 680 includes a path ("hdp://data/acme/prod/clean") for a data object corresponding to the clean dataset collection 630, a path ("hdp://data/acme/prod/out") for a data object corresponding to the output 634, a path ("hdp://data/acme/prod/raw1") for a data object corresponding to the first raw stage dataset collection 622, and a path ("hdp://data/acme/prod/raw2") for a data object corresponding to the second raw stage dataset collection 624.

The metadata 680 establishes a development pipeline role that corresponds to the path "hdp://acme/dev". The metadata 680 further establishes a production pipeline role that corresponds to the path "hdp://acme/prod".

For users, the metadata 680 establishes an ACME user corresponding to the path "hdp://user/acme". For workloads, the metadata 680 establishes workloads corresponding to specific components of the production 620 and development 660 pipelines. The workloads for the development pipeline 660 have the path prefix of "hdp://workload/acme/dev". A workload object stored at the path "hdp://workload/acme/dev/compare" corresponds to the compare stage 670. A workload object stored at the path "hdp://workload/acme/dev/step1" corresponds to the first processing stage 666 (the component under development). The workloads for the production pipeline 620 have the path prefix of "hdp://workload/acme/prod". A workload object stored at the path "hdp://workload/acme/prod/step1" corresponds to the first processing stage 626. A workload object stored at the path "hdp://workload/acme/prod/step2" corresponds to the second processing stage 632.

The metadata 680 further indicates the attachment of certain roles to particular principal paths. More specifically, a role 740 of "hdp://role/acme/user" is attached to the "hdp://role/acme" path, a role 750 of "hdp://data/acme/dev" path" is attached to the "hdp://workload/acme/dev" path, and a role 760 of hdp://role/acme/prod" is attached to the "hdp//workload/acme/prod" path.

The no write constraint 667 prohibiting the first processing stage 666 (the component under development) from writing to the clean dataset collection 630 of the production pipeline 620 is reflected by an access control expression 730 that is located at the "hdp://data/acme/prod" path. The access control expression 730 assigns permission for write operations on the "hdp://data/acme/prod" path to the production role (corresponding to the "hdp://role/acme/prod"

path). Moreover, due to inheritance, the access control expression 730 assigns permission for write operations on metadata paths that have the "hdp://data/acme/prod" path as a proper prefix. This means that first processing stage 626 and the second processing stage 632, which inherit the production role from the "hdp://workload/acme/prod" path, are allowed to write to the clean dataset collection 630 (corresponding to the "hdp://data/acme/prod/clean" path), the output 634 (corresponding to the "hdp://data/acme/prod/out" path), the first raw dataset collection 622 (corresponding to the "hdp://data/acme/prod/raw1" path) or the second raw dataset collection 624 (corresponding to the "hdp://data/acme/prod/raw2" path). The access control permission 730 does not assign permission for a Write operation to the development role, however, which precludes workloads of the development pipeline 660 from writing to data of the production pipeline 620 (and therefore imposes the write constraint 667).

The no read constraint 669 prohibiting the second processing stage 632 of the production pipeline 620 from reading from the clean dataset collection 668 of the development pipeline 660 is reflected by an access control expression 720 that is located at the "hdp://data/acme/dev" path. The access control expression 720 allows read operations on the "hdp://data/acme/dev" path for the development role (corresponding to the "hdp://role/acme/dev" path) and for the ACME user role (corresponding to the "hdp://role/acme/user" path). Due to inheritance, the write permission extends to paths that have "hdp://data/acme/dev" as a proper prefix. This means that all ACME users, regardless of whether they work in development or production may read the development pipeline data, including the clean dataset collection 668 and the first raw dataset collection 662. Moreover, the workloads of the development pipeline 660 (e.g., the compare stage 670 and the first processing stage 666) may read the clean dataset collection 668 and the first raw dataset collection 662. The access control permission 720 does not assign permission for a Read operation to the production role, however, which precludes workloads of the production pipeline 620 from reading the data of the production pipeline 620 (and therefore imposes the no read constraint 669).

Due to the access right constraints that are imposed by the metadata 680, production data is protected because production workloads can only read from production data and can only write to production data. Moreover, development is permitted because development workloads can read from production or developmental data and can write to developmental data. Additionally, overall privacy constraints can be satisfied because users cannot access production data, and only selected developers can see developmental data.

As an example of a proof, ACME and ABC share a system. All ACME users may be given the special role of "hdp://role/acme/acme-user" by applying it to "hdp://user/acme". The View permission can be set so that only users with the acme-user role can see any of the "hdp://data/acme", "hdp://role/acme", "hdp://user/acme", or "hdp://workload/acme" top-level directories. Further, the Apply-Role permission on "hdp://role/acme" is restricted to a few administrators of ACME.

A secure bootstrap process may be constructed by which the operator of the entire system can create the acme directory roots, the first role and first administrative user. This first administrative user may then create all other ACME users and associated roles. The proof of the correctness of this bootstrap is trivially done by tracing the sequence of steps and states.

Because the View permission controls whether a user or workload can interact with an object at all, these top-level permissions together with role and permission inheritance allows a proof that no ABC user can see any evidence that ACME even exists because none of the ABC users can already have the acme-user role. Moreover, all of the ABC users working together cannot acquire the role or even acquire the ability to acquire that role. As such, nothing that ABC users can do can change their visibility of ACME. Only an administrator with permissions on the acme-user role and administrative privileges over an ABC user could make this change.

The above-described proofs, as well as other proofs, are relatively simple, as compared to proofs normally used for software or hardware verification. For the verification of the current state, first-order temporal logic suffices. For purposes of proving what a set of users can do to change the current state, proofs may involve higher-order temporal logic. For these set of proofs, nothing more than induction on metadata states may be used. Moreover, such methods may be handled by existing proof assistants, such as Isabelle/HOL or $TLA_+$.

The bootstrap process may be repeated downwards. In this manner, the administrators at ACME can establish business units and give the administrators for these units control over their own users. All of the enterprise-wide constraints still apply, any users under either business unit inherit the acme-user role; and any data, roles, users or workloads inherit the access control imposed at the corporate level. Each unit is able to constrict access, but the unit is not able to broaden access rights.

Figure 8:
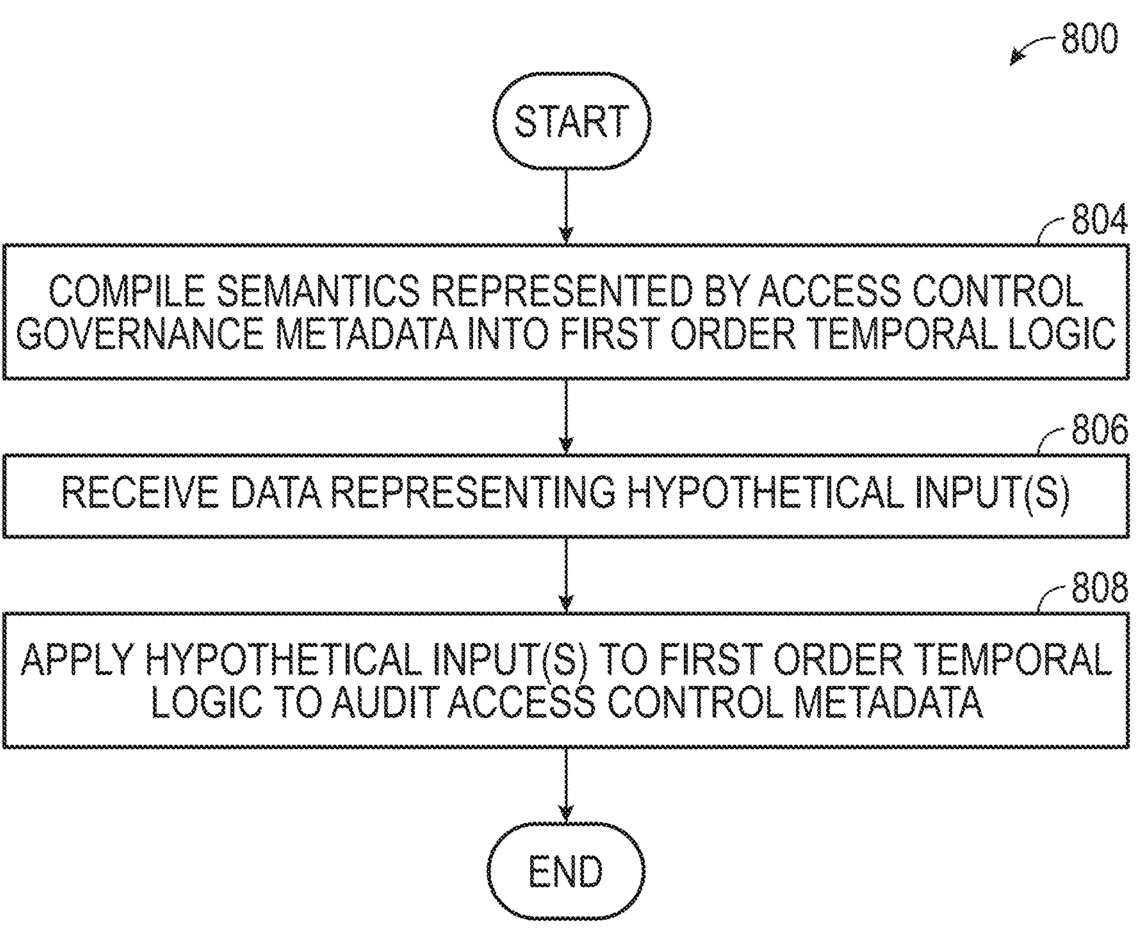
FIG. 8 is a flow diagram depicting a technique to audit access control governance metadata according to an example implementation.

Referring to FIG. 8, in accordance with some implementations, the access control manager or another entity may transform the metadata into logic for purposes of allowing the access controls to be audited. More specifically, referring to FIG. 8, in accordance with example implementations, an access rights management engine (e.g., an access rights management engine 184 of FIG. 1) may perform a process 800 that includes compiling (block 804) semantics, which are represented by access control governance metadata into first order temporal logic.

The process 800 includes receiving (block 806) data representing one or multiple hypothetical inputs and applying (block 808) the hypothetical input(s) to the first order temporal logic to audit the access control metadata.

In an example, the logic may be queried to determine whether, for example, a given user or workload is authorized to perform a particular operation or set of operations. In another example, the logic may be queried for purposes of determining a particular user or workload is authorized to perform a certain administrative operation. In another example, the logic may be queried for purposes of determining whether a user or workload is authorized to view or otherwise access a particular target path.

Figure 9:
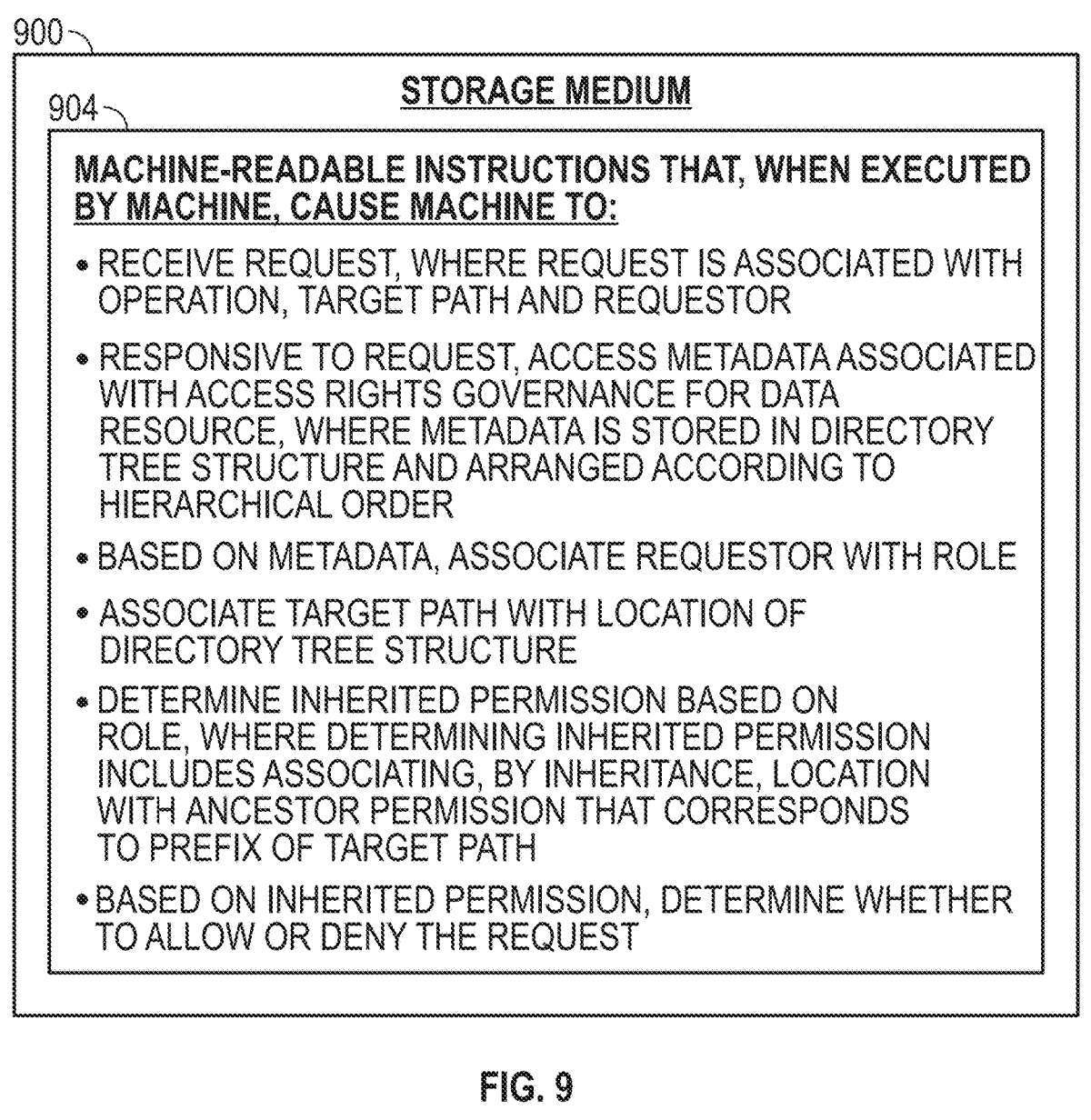

Referring to FIG. 9, in accordance with example implementations, a non-transitory storage medium 900 stores machine-readable instructions 904. The instructions 904, when executed by a machine, cause the machine to receive a request. The request is associated with an operation, a target path and a requestor. In an example, the machine may be associated with shared resources. In another example, the machine may be associated with a cloud service provider. In another example, the request may be associated with a multi-tenant cloud service instance. In an example, the request may be an access request to acquire credentials for performing an operation associated with a data resource, such as an operation to write a dataset to the resource or read a dataset from the data resource. In another example, the request may be an access request to acquire credentials for performing an operation associated with a resource other than a data resource. In another example, the access request may be an access request to modify, read or review metadata that governs access to a resource. In an example, the target path may correspond to a path of structured metadata. In another example, the target path may correspond to a path associated with a resource. In an example, the requestor may be a user. In another example, the requestor may be a workload.

The instructions 904, when executed by the machine, further cause the machine to, responsive to the request, access metadata that is associated with access control governance for a resource. The metadata includes a plurality of metadata objects that are stored in a directory tree structure and are arranged according to a hierarchical order. In an example, the directory tree structure may include subtrees corresponding to different base metadata types. In an example, a base metadata type may correspond to users. In another example, a base metadata type may correspond to data. In another example, a base metadata type may correspond to roles. In another example, a base metadata type may correspond to workloads. In an example, a location of the metadata may be represented by a path.

The instructions 904, when executed by the machine, further cause the machine to, based on the metadata, associate the requestor with a role. In an example, the machine associates the requestor with a role directly associated to a principal path of the metadata, which corresponds to the requestor. In another example, the machine associates the requestor with an indirect, or inherited, role that is associated with an ancestor as defined by a principal path of the metadata, which corresponds to the requestor. In an example, the role may be applied, or attached, to a principal path corresponding to the requestor. In an example, the machine may determine a collection of effective roles of the requestor, including one or multiple directly-assigned roles and one or multiple inherited roles.

The instructions 904, when executed by the machine, further cause the machine to associate the target path with a location of the directory tree structure. In an example, the location may be a path associated with a user base metadata class. In an example, the location may be a path associated with a data base metadata class. In an example, the location may be a path associated with a role base metadata class. In an example, the location may be a path associated with a workload base metadata class. In an example, the location may be a path associated with a data resource whose access is governed by the metadata.

The instructions 904, when executed by the machine, further cause the machine to determine an inherited permission based on the role. Determining the inherited permission includes associating, by inheritance, the location with an ancestor permission that corresponds to a prefix of the target path. In an example, determining the inherited permission includes identifying an access control expression and determining whether the requestor has an effective role set forth in an access control list of the access control expression. In an example, the access control expression may be directly assigned to the location. In another example, the access control expression may be inherited and may correspond to a proper prefix of the target path.

The instructions, when executed by the machine, further cause the machine to, based on the inherited permission, determine whether to allow or deny the request. In an example, determining whether to allow or deny the request includes determining whether the metadata authorizes permissions for multiple operations including the operation represented by the request. In an example, the operation represented by the request may be an operation to read data, and determining whether to allow or deny the request includes determining whether the metadata contains a permission for a view operation to view the data and a permission for a read operation to read the data. In another example, the operation represented by the request may be an administrative operation, and determining whether to allow or deny the request includes determining whether the metadata contains a permission for an administrative operation as well as a permission for the operation represented by the request. In an example, determining whether to allow or deny the request includes determining whether or not the metadata is updated. In an example, determining whether to allow or deny the request includes determining whether or not to acquire credentials to be used by the requestor to access data. In an example, determining whether to allow or deny the request includes determining whether or not a location identifier to be used by the requestor to access data.

Referring to FIG. 10, in accordance with example implementations, a technique 1000 includes receiving (block 1004), by an access rights management engine and from a requestor, a request to perform an operation. In an example, the operation may correspond to a read operation to read data from a data resource. In another example, the operation may correspond to a write operation to write data to a data resource. In another example, the operation may correspond to an operation to modify access control governance metadata. In an example, the request may be provided by the requestor to receive a credential for accessing data associated with a data resource. In an example, the credential may include a cryptographic key. In an example, the credential may be a token, such as a JWT. In an example, the credential may have an expiry time. In an example, the request may be provided by the requestor to receive a location identifier for data associated with a data resource. In an example, the location identifier may be a URL.

The technique 1000 includes, pursuant to block 1008, responsive to the request, accessing, by the access rights management engine, metadata that is associated with access control governance for a resource, and regulating, by the access rights management engine, a response to the request based on the metadata. The metadata includes a path that is associated with the requestor. In an example, the resource may be a data resource. In another example, the resource may be a resource (e.g., a network or a microservice) other than a data resource. In an example, regulating the response to the request includes granting or denying the request. In an example, the request is associated with updating the metadata, and regulating the response to the request includes determining whether the metadata authorizes the update. In an example, the request is associated with accessing a dataset of a data resource, and regulating the response includes determining whether the metadata authorizes the operation to access the dataset. In an example, the path is a path defined by a subtree structure of the metadata associated with principals.

Regulating the response can include determining an inherited role for the requestor based on a role associated with a prefix of the path. In an example, the path may identify a first principal corresponding to the requestor, and the prefix may identify a second principal that is an ancestor of the first principal. In an example, determining the role associated with the prefix of the path includes identifying a role attached to the second principal. In an example, one or multiple effective roles for the first principal may be determined, including the inherited role and one or multiple other roles. In examples, the other role may be another inherited role or a role directly assigned to the first principal. In an example, roles may be defined by a portion of the metadata stored in a subtree structure associated with a role metadata base type.

Regulating the response can include determining, based on the inherited role, whether the metadata allows the operation for the inherited role. In an example, determining whether the metadata allows the operation for the inherited role may include determining whether the metadata contains a permission that corresponds to the operation and is associated with the inherited role. In an example, determining whether the metadata allows the operation may include determining one or multiple effective access control expressions.

Regulating the response further can include initiating an action in furtherance of the operation responsive to the determination that the metadata allows the operation for the inherited role. In an example, the action may be a modification of the metadata. In another example, the action may include determining a credential to be used by the requestor to perform the operation. In another example, the action may include determining a location identifier to be used by the requestor to perform the operation.

Figure 11:
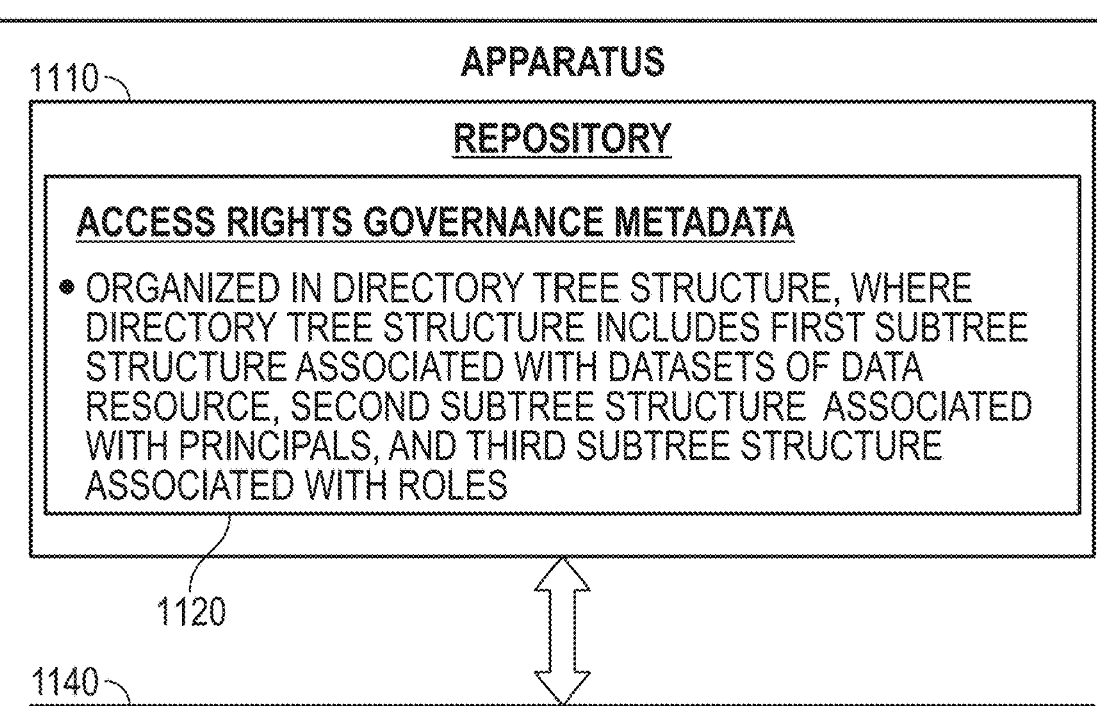
FIG. 11 is a block diagram of an apparatus that includes a permission management engine to regulate both access rights for access control governance metadata and access rights for a data resource according to an example implementation.

Referring to FIG. 11, in accordance with example implementations, an apparatus 1100 includes a repository 1110 and a permission management engine 1140. In an example, the repository 1110 may be a fault tolerant cluster of storage nodes. In an example, the repository 1110 may be a Raft cluster. In an example, the repository 1110 may be a cluster of storage nodes that use a consensus algorithm to reach agreements among the storage nodes. In an example, the permission manager 1140 may be a front-end process to process access requests based on metadata stored in the repository.

The repository 1110 stores access control governance metadata 1120 that is organized in a directory tree structure. The directory tree structure includes a first subtree structure that is associated with datasets of a data resource, a second subtree structure that is associated with principals, and a third subtree structure that is associated with roles. In an example, the directory tree structure includes root and four directories below the root corresponding to the respective three subtree structures. In an example, the second subtree structure may store metadata describing a hierarchical organization of users. In an example, the second subtree structure may store metadata describing a hierarchical organization of workloads. In an example, the directory tree structure may have a subtree structure associated with users and a subtree structure associated with workloads.

The permission management engine 1140, responsive to a first request to access a given dataset, regulates, based on the access control governance metadata, whether the operation is allowed. In an example, regulating whether the operation is allowed includes identifying effective roles of the requestor based on the metadata. In an example, regulating whether the operation is allowed includes identifying effective access control expressions represented by the metadata and evaluating the identified effect access control expressions based on the identified effective roles. In an example, evaluating effective access control expressions includes determining one or multiple inherited permissions correspond to an operation identified by the request. In an example, evaluating effective access control expression includes determining one or multiple local permissions correspond to an operation identified by the request. In an example, identifying effective roles includes determining one or multiple inherited roles based on metadata stored in the second and third subtree structures.

The permission management engine, responsive to a second request to access the access control governance metadata, associates a requestor of the second request with a given principal, determines an inherited role for the given principal based on the third directory and determines an inherited permission corresponding to the second request based on the inherited role and permissions represented by the access control governance metadata. The permission manager engine, determines, based on the inherited permission, whether to allow or deny the second request. In an example, the second request corresponds to a request to write to the metadata. In an example, the second request corresponds to a request to add a path to or remove a path from the directory tree structure. In an example, the second request corresponds to a request to modify metadata stored in the second subtree structure to attach a role to a principal. In an example, the second request corresponds to a request to modify the metadata to add a role to an access control expression. In an example, the second request corresponds to a request to modify the metadata to remove a role from an access control expression. In an example, the second request corresponds to a request to perform an administrative-related operation to modify the metadata.

The operation may be an operation on the metadata. Among the particular advantages, the metadata, having the property of meta-circularity, may control access to data resources and control access to access to itself.

The first inherited permission, in accordance with some implementations, may be determined based on an evaluation of a first access control expression associated with the first prefix. The first access control expression associates the first inherited permission with the role. Among the potential advantages, access control rights may be delegated, which may be particularly beneficial for a resource namespace that is associated with a namespace operator and shared by multiple tenants.

The second inherited permission, in accordance with example implementations, is determined based on the role. Determining the second inherited permission includes associating, by inheritance, the first location with the second ancestor permission. The instructions when executed by the machine, further cause the machine to determine whether to allow or deny the request based on the second inherited permission. Among the potential advantages, access control rights may be delegated, which may be particularly beneficial for a resource namespace that is associated with a namespace operator and shared by multiple tenants.

In accordance with example implementations, a second prefix of the target path is associated with a second ancestor permission that is constrained to be local. The second ancestor permission is not inherited responsive to a determination that the second ancestor permission is constrained to be local. Among the potential advantages, access control rights of a namespace operator may be limited, which may be particularly beneficial for purposes of preventing the namespace operator from viewing or otherwise accessing tenant configuration and data.

The directory tree structure may include a subtree structure that stores a portion of the metadata corresponding to one of a principal metadata base type, a data metadata base type or a role metadata base type. The target path corresponds to the subtree structure. Among the potential advantages, access control rights may be delegated, which may be particularly beneficial for a resource namespace that is associated with a namespace operator and shared by multiple tenants.

The directory tree structure may include a first subtree structure that stores a first portion of the metadata corresponding to a hierarchical organization of roles and a second subtree structure storing a second portion of the metadata corresponding to a hierarchical organization of principals. The instructions, when executed by the machine, further cause the machine to access the second subtree structure to identify a second location of the second subtree structure corresponding to a principal of the principals and corresponding to the requestor. The instructions, when executed by the machine, further cause the machine to, responsive to the identification of the second location, identify the role. Among the potential advantages, access control rights may be delegated, which may be particularly beneficial for a resource namespace that is associated with a namespace operator and shared by multiple tenants.

In accordance with example implementations, the second location corresponds to a second path. The role is identified based on the second portion of the metadata representing the role being attached to a location corresponding to the second path or the second portion of the metadata representing the role being attached to a location corresponding to a prefix of the second path. Among the potential advantages, access control rights may be delegated, which may be particularly beneficial for a resource namespace that is associated with a namespace operator and shared by multiple tenants.

The requestor may be a human user or a workload. Among the potential advantages, access control rights may be delegated, which may be particularly beneficial for a resource namespace that is associated with a namespace operator and shared by multiple tenants.

The directory tree structure may include a first subtree structure that stores a first portion of the metadata corresponding to a hierarchical organization of datasets of the data resource. The target path corresponds to a given dataset of the datasets. The instructions, when executed by the machine, further cause the machine to acquire, based on the first inherited permission, a credential for the requestor to allow the requestor to access the given dataset. Among the potential advantages, access control rights may be delegated, which may be particularly beneficial for a resource namespace that is associated with a namespace operator and shared by multiple tenants.

The directory tree structure may include a first subtree structure that stores a first portion of the metadata corresponding to a hierarchical organization of datasets of the data resource. The target path corresponds to a given dataset of the datasets. A location identifier for the requestor may be acquired based on the first inherited permission. The location identifier allows the requestor to access the given dataset. Among the potential advantages, access control rights may be delegated, which may be particularly beneficial for a resource namespace that is associated with a namespace operator and shared by multiple tenants.

In accordance with example implementations, the directory tree structure includes a first subtree structure that stores a first portion of the metadata corresponding to a hierarchical organization of datasets of the data resource. The target path corresponds to a given dataset of the datasets. If the first inherited permission represents authorization for the operation, then a credential and a location identifier for the given dataset is requested from a credential manager; and respond to the requestor with the credential and location identifier. Among the potential advantages, access control rights may be delegated, which may be particularly beneficial for a resource namespace that is associated with a namespace operator and shared by multiple tenants.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a", "an", and "the" are intended to include the plural forms as well, unless the context clearly indicates otherwise. The term "plurality", as used herein, is defined as two or more than two. The term "another", as used herein, is defined as at least a second or more. The term "connected", as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A non-transitory storage medium that stores machine-readable instructions that, when executed by a machine, cause the machine to:

receive a request, wherein the request is associated with an operation, a target path and a requestor;

responsive to the request, access metadata associated with access control governance for a data resource, wherein the metadata is stored in a directory tree structure and arranged according to a hierarchical order;

based on the metadata, associate the requestor with a role;

associate the target path with a first location of the directory tree structure;

determine a first inherited permission based on the role, wherein determining the first inherited permission comprises associating, by inheritance, the first location with a first ancestor permission that corresponds to a first prefix of the target path; and based on the first inherited permission determine whether to allow or deny the request, wherein a second prefix of the target path is associated with a second ancestor permission that is constrained to be local; and responsive to determining that the second ancestor permission is constrained to be local, not inherit the second ancestor permission for the second prefix.

2. The storage medium of claim 1, wherein the operation comprises an operation on the metadata.

3. The storage medium of claim 1, wherein the instructions, when executed by the machine, further cause the machine to determine the first inherited permission based on an evaluation of a first access control expression associated with the first prefix, wherein the first access control expression associates the first inherited permission with the role.

4. A non-transitory storage medium that stores machine-readable instructions that, when executed by a machine, cause the machine to:

receive a request, wherein the request is associated with an operation, a target path and a requestor;

responsive to the request, access metadata associated with access control governance for a data resource, wherein the metadata is stored in a directory tree structure and arranged according to a hierarchical order;

based on the metadata, associate the requestor with a role;

associate the target path with a first location of the directory tree structure;

determine a first inherited permission based on the role, wherein determining the first inherited permission comprises associating, by inheritance, the first location with a first ancestor permission that corresponds to a first prefix of the target path; and based on the first inherited permission determine whether to allow or deny the request, wherein the directory tree structure comprises a first subtree structure storing a first portion of the metadata corresponding to a hierarchical organization of roles and a second subtree structure storing a second portion of the metadata corresponding to a hierarchical organization of principals;

access the second subtree structure to identify a second location of the second subtree structure corresponding to a principal of the principals and corresponding to the requestor; and responsive to the identification of the second location, identify the role.

5. The storage medium of claim 4, wherein the instructions, when executed by the machine, further cause the machine to:

determine a second inherited permission based on the role, wherein determining the second inherited permission comprises associating, by inheritance, the first location with the second ancestor permission; and further determine whether to allow or deny the request based on the second inherited permission.

6. The storage medium of claim 1, wherein:

the directory tree structure comprises a subtree structure storing a portion of the metadata corresponding to one of a principal metadata base type, a data metadata base type or a role metadata base type; and the target path corresponds to the subtree structure.

7. The storage medium of claim 4, wherein:

the second location corresponds to a second path; and the instructions, when executed by the machine, further cause the machine to identify the role based on the second portion of the metadata representing the role being attached to a location corresponding to the second path or the second portion of the metadata representing the role being attached to a location corresponding to a prefix of the second path.

8. The storage medium of claim 1, wherein:

the directory tree structure comprises a first subtree structure storing a first portion of the metadata corresponding to a hierarchical organization of datasets of the data resource;

the target path corresponds to a given dataset of the datasets; and the instructions, when executed by the machine, further cause the machine to acquire, based on the first inherited permission, a credential for the requestor to allow the requestor to access the given dataset.

9. The storage medium of claim 1, wherein:

the directory tree structure comprises a first subtree structure storing a first portion of the metadata corresponding to a hierarchical organization of datasets of the data resource;

the target path corresponds to a given dataset of the datasets; and the instructions when executed by the machine further cause the machine to acquire, based on the first inherited permission, a location identifier for the requestor to allow the requestor to access the given dataset.

10. The storage medium of claim 1, wherein:

the directory tree structure comprises a first subtree structure storing a first portion of the metadata corresponding to a hierarchical organization of datasets of the data resource;

the target path corresponds to a given dataset of the datasets; and the instructions when executed by the machine further cause the machine to, responsive to the first inherited permission representing authorization for the operation:

request a credential and a location identifier for the given dataset from a credential manager; and respond to the requestor with the credential and location identifier.

11. A method comprising:

receiving, by an access rights management engine and from a requestor, a request to perform an operation; and responsive to the request, accessing, by the access rights management engine, metadata associated with access control governance for a resource, and regulating, by the access rights management engine, a response to the request based on the metadata, wherein the metadata comprises a path associated with the requestor, and regulating the response to the request comprises:

determining an inherited role for the requestor based on a role associated with a prefix of the path;

determining, based on the inherited role, whether the metadata allows the operation for the inherited role; and initiating an action in furtherance of the operation responsive to a determination that the metadata allows the operation for the inherited role;

compiling semantics represented by the access control governance metadata into first order temporal logic; and auditing the access control governance metadata, wherein the auditing comprises providing inputs to the first order temporal logic and evaluating outputs provided by the first order temporal logic resulting from the inputs.

12. The method of claim 11, wherein the operation comprises one of:

an operation on the resource; or an operation on the metadata.

13. The method of claim 11, wherein:

the request identifies a target path; and determining whether the metadata allows the operation for the inherited role comprises:

identifying an access control expression associated with the target path, wherein the access control expression associates a permission with collection of roles; and evaluating the access control expression to determine if the inherited role is a role of the collection of roles.

14. A method comprising:

receiving, by an access rights management engine and from a requestor, a request to perform an operation; and responsive to the request, accessing, by the access rights management engine, metadata associated with access control governance for a resource, and regulating, by the access rights management engine, a response to the request based on the metadata, wherein the metadata comprises a path associated with the requestor, and regulating the response to the request comprises:

determining an inherited role for the requestor based on a role associated with a prefix of the path;

determining, based on the inherited role, whether the metadata allows the operation for the inherited role; and initiating an action in furtherance of the operation responsive to a determination that the metadata allows the operation for the inherited role;

compiling semantics represented by the access control governance metadata into first order temporal logic; and proving a current state of the access control governance based solely on the first order temporal logic.

15. The method of claim 14, wherein the operation comprises one of:

an operation on the resource; or an operation on the metadata.

16. The method of claim 14, wherein:

the request identifies a target path; and determining whether the metadata allows the operation for the inherited role comprises:

identifying an access control expression associated with the target path, wherein the access control expression associates a permission with collection of roles; and evaluating the access control expression to determine if the inherited role is a role of the collection of roles.

17. The method of claim 14, further comprising:

compiling semantics represented by the access control governance metadata into first order temporal logic; and auditing the access control governance metadata, wherein the auditing comprises providing inputs to the first order temporal logic and evaluating outputs provided by the first order temporal logic resulting from the inputs.

* * * * *